United States Patent
Mochizuki et al.

[19]

[11] Patent Number: 5,903,273
[45] Date of Patent: May 11, 1999

[54] APPARATUS AND METHOD FOR GENERATING AN IMAGE FOR 3-DIMENSIONAL COMPUTER GRAPHICS

[75] Inventors: Yoshiyuki Mochizuki, Osaka; Makoto Hirai, Suita, both of Japan

[73] Assignee: Matsushita Electric Industrial Co., Ltd., Kadoma, Japan

[21] Appl. No.: 08/918,380

[22] Filed: Aug. 26, 1997

Related U.S. Application Data

[63] Continuation of application No. 08/363,723, Dec. 23, 1994, abandoned.

[30] Foreign Application Priority Data

Dec. 28, 1993 [JP] Japan .................................. 5-349426

[51] Int. Cl.$^6$ .................................................. G06T 17/20
[52] U.S. Cl. .................................................. 345/423
[58] Field of Search .................................. 345/418–423, 345/425–427, 430, 424

[56] References Cited

U.S. PATENT DOCUMENTS

| | | | |
|---|---|---|---|
| 4,855,934 | 8/1989 | Robinson | 345/430 |
| 4,858,149 | 8/1989 | Quarendon | 345/425 |
| 4,888,583 | 12/1989 | Ligocki et al. | 345/420 |
| 4,901,064 | 2/1990 | Deering | 345/426 |
| 4,935,879 | 6/1990 | Ueda | 345/425 X |
| 5,058,042 | 10/1991 | Hanna et al. | 345/427 |
| 5,103,217 | 4/1992 | Cawley | 345/429 |
| 5,107,444 | 4/1992 | Wu | 345/425 X |
| 5,255,352 | 10/1993 | Falk | 345/425 |
| 5,299,298 | 3/1994 | Elmquist et al. | 345/421 |
| 5,307,450 | 4/1994 | Grossman | 345/423 |
| 5,361,386 | 11/1994 | Watkins et al. | 345/430 |
| 5,363,475 | 11/1994 | Baker et al. | 345/431 |
| 5,448,687 | 9/1995 | Hoogerhyde et al. | 345/425 |
| 5,448,690 | 9/1995 | Shiraishi et al. | 345/433 |
| 5,490,240 | 2/1996 | Foran et al. | 345/430 |
| 5,537,224 | 7/1996 | Suzuoki et al. | 358/462 |
| 5,555,356 | 9/1996 | Scheibl | 345/434 |

FOREIGN PATENT DOCUMENTS

| | | |
|---|---|---|
| 3201081 | 9/1991 | Japan . |
| 528235 | 2/1993 | Japan . |
| 5108811 | 4/1993 | Japan . |

OTHER PUBLICATIONS

Foley et al., Computer Graphics: Principles and Practice, 1990, pp. 229–242, 478–483, 617–623, 686–717, 741–744, 754–756, 806–813.

Schilling et al., EXACT: Algorithm and Hardware Architecture for an Improved A–Buffer, ACM Computer Graphics, Aug. 1993, pp. 85–91.

(List continued on next page.)

*Primary Examiner*—Anton Fetting
*Attorney, Agent, or Firm*—Renner, Otto, Boisselle & Sklar, P.L.L.

[57] ABSTRACT

An apparatus of the invention generates an image including a plurality of pixels by mapping a plurality of texture data onto a surface of an object. The apparatus includes: a geometrical transformation section for geometrically transforming a curved surface defined in a 3-dimensional space into a curved surface in a 2-dimensional screen space; a micro-polygon generating section for dividing the curved surface in the 2-dimensional screen space into a plurality of partial curved surfaces in accordance with the number of the plurality of texture data, and for generating a micro-polygon in accordance with each of the plurality of partial curved surfaces; an area contribution determining section for determining an area contribution of the micro-polygon to a pixel included in the image, based on a relative positional relationship between the micro-polygon and the pixel; a texture data acquiring section for acquiring texture data in accordance with the micro-polygon; and an intensity-value determining section for determining an intensity value of the pixel, based on the area contribution determined by the area contribution determining section and the texture data acquired by the texture data acquiring section.

10 Claims, 14 Drawing Sheets

OTHER PUBLICATIONS

Bennis et al., Piecewise Surface Flattening for Non–Distorted Texture Mapping, ACM Computer Graphics, Jul. 1991, pp. 237–246.

Crawfis et al., Texture Splats for 3D Scalar and Vector Field Visualization, IEEE Visualization, Oct. 1993, pp. 261–267.

Cook et al, Computer Graphics, vol. 21, No. 4, Jul. 1987, "The Reyes Image Rendering Architecture", pp. 95–102.

Search Report for French Appl. 9415806000, Mailed Mar. 11, 1996.

Sweeney et al., IEEE, 1986, No. 2, N.Y., pp. 41–49, "Ray Tracing Free–Form B–Spline Surfaces".

Boriatouch et al, IRISA, pp. 107–124, France, "A VLSI Chip for Ray Tracing, Bicubic Patches.", Eurographics '89 (Sep. 1989).

Abi–Ezzi et al, Eurographics '91, No. Holland, pp. 385–397, "Tesselation of Curved Surfaces Under Highly Varying Transformations".

Bi-cubic B-spline surface

FIG.12
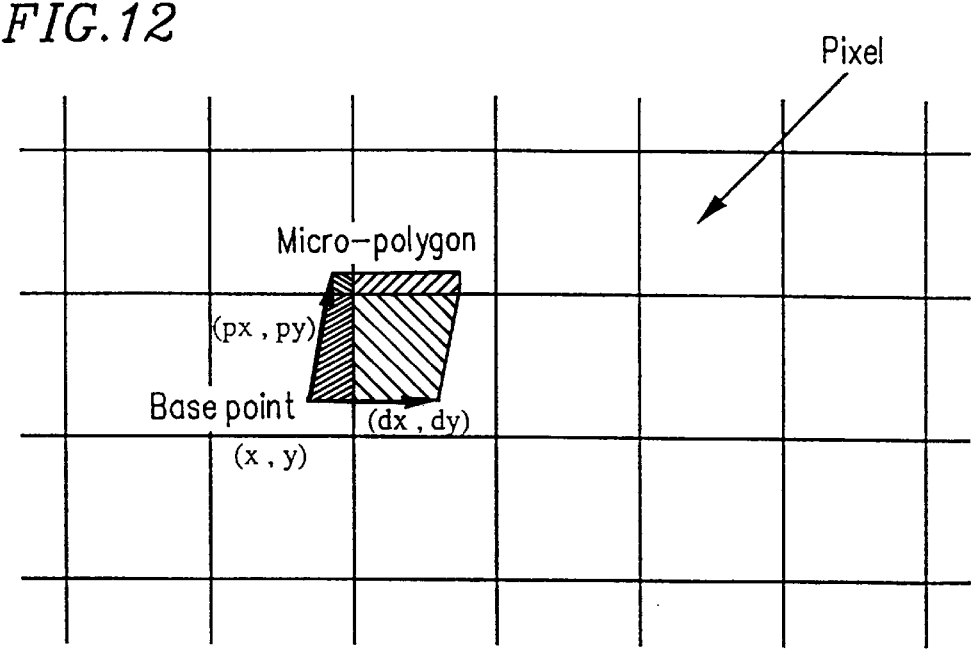
FIG.13  5×5-pixel region
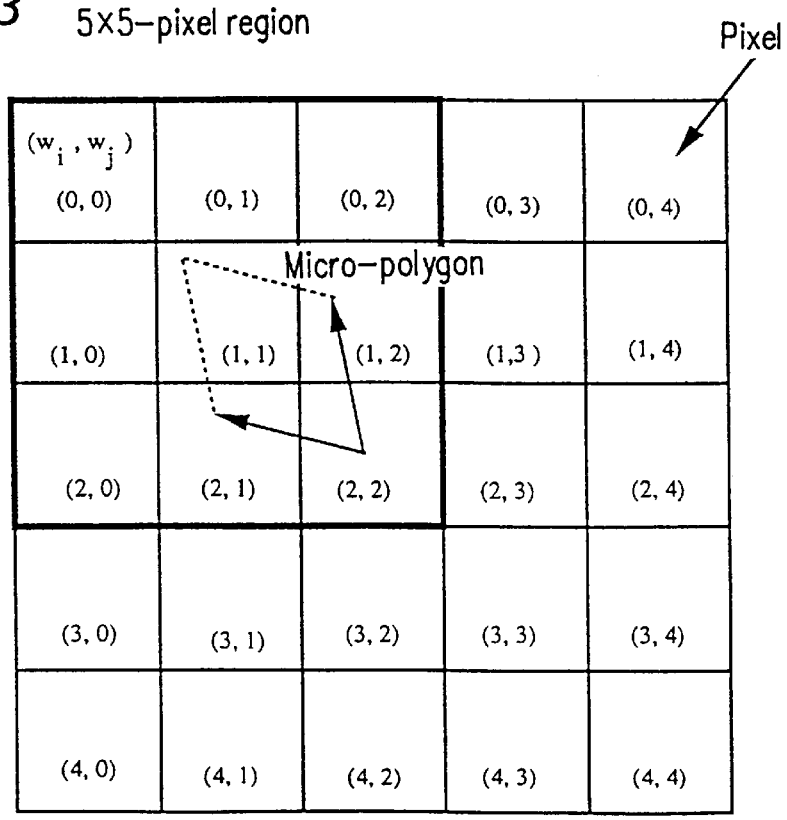

FIG.14A
Address
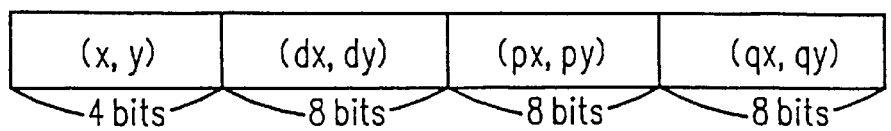
FIG.14B
Address (Parallelogram, triangle)
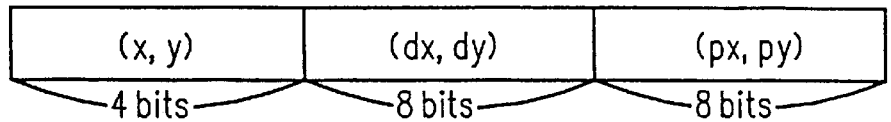
FIG.15
Output data
| (wi, wj) | Area contribution | Area contribution | ... | Area contribution | Area contribution | Area contribution |

APPARATUS AND METHOD FOR GENERATING AN IMAGE FOR 3-DIMENSIONAL COMPUTER GRAPHICS

This is a continuation of application Ser. No. 08/363,723 filed on Dec. 23, 1994, now abandoned.

BACKGROUND OF THE INVENTION

1. Field of the Invention

The present invention relates to an apparatus and a method for rapidly generating a high-quality image in 3-dimensional computer graphics.

2. Description of the Related Art

Ray tracing and radiosity are known as typical conventional techniques for generating a high-quality image. These techniques have a disadvantage in that a considerably long time is increasingly required for completing the calculation, as the scene to be displayed becomes complicated and the model to be displayed becomes larger. Such a disadvantage constitutes a critical problem particularly when an animation including complicated scenes and large models is to be produced. One of the main advantages of the ray tracing and the radiosity resides in a non-local lighting effect. However, such an effect can be approximately attained by texture mapping. In actuality, it is more important to attain an advantage in that a high-quality image of a complicated shape and a large model can be displayed in a short time, rather than the non-local lighting effect by the ray tracing and the radiosity. In view of this, Cook et al. devised a technique for rendering in which all objects are reduced to micro-polygons as basic units. This technique is described in detail in the following article:

Robert L. Cook, Loren Carpenter, Edwin Catmull, "The Reyes Image Rendering Architecture", Computer Graphics (SIGGRAPH'87 Proceedings), Vol. 21, No. 4, pp. 95–102, July 1987.

The outline of the technique is described below.

First, polygons and curved surfaces which constitute objects defined in a world space (i.e., a 3-dimensional space) are divided into geometric entities called micro-polygons. The dividing process is performed, for example, by forward difference calculus, so that each micro-polygon has an area of about ¼ pixel if it is transformed into a 2-dimensional screen space. Note that the dividing process is always performed in a 3-dimensional view coordinate system space. After the dividing process, the resultant micro-polygons are geometrically transformed into a 2-dimensional screen space. The geometrically transformed micro-polygons are processed by clipping. Then, an area contribution to a pixel is determined for each micro-polygon by jittering which is one type of stochastic sampling. As a result, an image is generated. The stochastic sampling method is similar to the Monte Carlo method, and the jittering which is one type of the stochastic sampling is used for sampling micro-polygons which overlap sub-pixels. Specifically, a pixel is divided into a number of sub-pixels, and each sub-pixel has one sample point in the inside thereof. The location of the sample point within the sub-pixel is determined by adding a random displacement to the location of the center of the sub-pixel. Such a way of determining the location is called jittering. The operation of jittering is required to be repeated predetermined number of times obtained by multiplying the number of pixels to be written by rendering by the dividing number for generating sub-pixels. An image generated by the above-described rendering method is comparable to images generated by the ray tracing method and the radiosity method.

However, by the above-described rendering method, the micro-polygons are generated in a 3-dimensional view coordinate system space, so that all of the generated micro-polygons are required to be geometrically transformed into a 2-dimensional screen space. The number of generated micro-polygons is 6,800,000 in the example described in the above-identified article. In a more complicated scene, the number of micro-polygons is further increased. Thus, an enormous amount of calculation is required for the geometrical transformations of all of the micro-polygons.

Since the above-described method uses the jittering, it is necessary to generate random numbers a predetermined number of times which are determined by multiplying the number of pixels to be written by rendering by the dividing number for generating sub-pixels. It is experimentally known that, in a complicated scene, the writing operation to pixels are performed for three or more screens. Even if the screen is a small one, the screen includes 640×480 pixels. In the above-identified article, the dividing number for generating subpixels is 16, so that the generation of random numbers is repeated at least 14,745,600 times. Accordingly, an enormous amount of calculation is also required for the jittering operation.

SUMMARY OF THE INVENTION

The apparatus of this invention for generating an image including a plurality of pixels by mapping a plurality of texture data onto a surface of an object, includes: geometrical transformation means for geometrically transforming a curved surface defined in a 3-dimensional space into a curved surface in a 2-dimensional screen space; micro-polygon generating means for dividing the curved surface in the 2-dimensional screen space into a plurality of partial curved surfaces in accordance with the number of the plurality of texture data, and for generating a micro-polygon in accordance with each of the plurality of partial curved surfaces; area contribution determining means for determining an area contribution of the micro-polygon to a pixel included in the image, based on a relative positional relationship between the micro-polygon and the pixel; texture data acquiring means for acquiring texture data in accordance with the micro-polygon; and intensity-value determining means for determining an intensity value of the pixel, based on the area contribution determined by the area contribution determining means and the texture data acquired by the texture data acquiring means.

In one embodiment of the invention, the curved surface defined in the 3-dimensional space is defined by a plurality of first control points, and the apparatus further includes: means for calculating a plurality of points on the curved surface defined in the 3-dimensional space, based on the plurality of first control points; means for transforming the plurality of points on the curved surface defined in the 3-dimensional space into a plurality of points on the 2-dimensional screen space; and means for calculating a plurality of second control points, based on the plurality of points on the curved surface in the 2-dimensional screen space, whereby the curved surface in the 2-dimensional screen space is defined by the plurality of second control points.

In another embodiment of the invention, the micro-polygon generating means approximately represents each of the plurality of partial curved surfaces as at least one polygon having a predetermined shape, and generates a micro-polygon corresponding to the approximately represented at least one polygon.

In another embodiment of the invention, the polygon having the predetermined shape includes at least one of a quadrangle, a parallelogram, and a triangle.

In another embodiment of the invention, the micro-polygon is defined by a base point and a plurality of vectors, and the area contribution determining means includes: an area-contribution table for storing a plurality of area contributions which are previously defined; address generating means for generating an address used when the area-contribution table is referred to, based on the position of the base point and the plurality of vectors; and area-contribution referring means for obtaining an area contribution of the micro-polygon to a pixel, by referring to the area-contribution table in accordance with the address generated by the address generating means.

In another embodiment of the invention, the apparatus further includes re-division means for repeatedly dividing the micro-polygons until sizes of the micro-polygons generated by the micro-polygon generating means become equal to or smaller than a prescribed size, whereby only micro-polygons having sizes which are equal to or smaller than the prescribed size are output to the area contribution determining means.

In another embodiment of the invention, the curved surface in the 3-dimensional space has a front face and a back face, and the apparatus further comprises back-face culling means for determining a micro-polygon which is not rendered, based on information defining a direction of the front face of the curved surface and information defining a direction of a normal vector of the micro-polygon.

In another embodiment of the invention, the apparatus further includes: means for changing a generation sequence of the micro-polygons so that the micro-polygons are generated in a predetermined direction with respect to a depth after projecting 3-dimensional space into 2-dimensional screen space; and means for changing an access sequence to the texture data depending on the changed generation sequence of the micro-polygons.

In another embodiment of the invention, the micro-polygon is defined by a base point and a plurality of vectors, and each of the plurality of pixels is divided into a plurality of sub-pixels, each of the plurality of sub-pixels having a defined representative point in the inside thereof, and wherein the area contribution determining means includes: inside/outside determining means for determining whether the representative point of the sub-pixel is positioned within a region defined by the micro-polygon or not, depending on a relative positional relationship among the representative point of the sub-pixel, the base point, and the plurality of vectors; counting means for counting the number of sub-pixels having representative points which are positioned within the region defined by the micro-polygon, based on the determination result by the inside/outside determining means; and area-contribution calculating means for calculating the area-contribution based on the number of sub-pixels counted by the counting means and areas of the sub-pixels.

According to another aspect of the invention, a method for generating an image including a plurality of pixels by mapping a plurality of texture data onto a surface of an object is provided. The method includes the steps of: (a) geometrically transforming a curved surface defined in a 3-dimensional space into a curved surface in a 2-dimensional screen space; (b) dividing the curved surface in the 2-dimensional screen space into a plurality of partial curved surfaces in accordance with the number of the plurality of texture data; (c) generating a micro-polygon in accordance with each of the plurality of partial curved surfaces; (d) determining an area contribution of the micro-polygon to a pixel included in the image, based on a relative positional relationship between the micro-polygon and the pixel; (e) acquiring one of the plurality of texture data in accordance with the micro-polygon; and (f) determining an intensity value of the pixel, based on the area contribution determined in step (d) and the texture data acquired in step (e).

In one embodiment of the invention, the curved surface defined in the 3-dimensional space is defined by a plurality of first control points, and the method further comprises the steps of: calculating a plurality of points on the curved surface defined in the 3-dimensional space, based on the plurality of first control points; transforming the plurality of points on the curved surface defined in the 3-dimensional space into a plurality of points on the 2-dimensional screen space; and calculating a plurality of second control points, based on the plurality of points on the curved surface in the 2-dimensional screen space, whereby the curved surface in the 2-dimensional screen space is defined by the plurality of second control points.

In another embodiment of the invention, the step (c) includes the steps of: approximately representing each of the plurality of partial curved surfaces as at least one polygon having a predetermined shape; and generating a micro-polygon corresponding to the approximately represented at least one polygon.

In another embodiment of the invention, the polygon having the predetermined shape includes at least one of a quadrangle, a parallelogram, and a triangle.

In another embodiment of the invention, the micro-polygon is defined by a base point and a plurality of vectors, and the step (d) includes the step of selecting an area contribution of the micro-polygon to a pixel among a plurality of area contributions which are previously defined, based on the position of the base point and the plurality of vectors.

In another embodiment of the invention, the method further includes the step of repeatedly dividing the micro-polygons until sizes of the micro-polygons generated in step (c) become equal to or smaller than a prescribed size.

In another embodiment of the invention, the curved surface in the 3-dimensional space has a front face and a back face, and the method further comprises the step of determining a micro-polygon which is not rendered, based on information defining a direction of the front face of the curved surface and information defining a direction of a normal vector of the micro-polygon.

In another embodiment of the invention, the method further includes the steps of: changing a generation sequence of the micro-polygons so that the micro-polygons are generated in a predetermined direction with respect to a depth of the 2-dimensional screen space; and changing an access sequence to the texture data depending on the changed generation sequence of the micro-polygons.

In another embodiment of the invention, the micro-polygon is defined by a base point and a plurality of vectors, and each of the plurality of pixels is divided into a plurality of sub-pixels, each of the plurality of sub-pixels having a defined representative point in the inside thereof, and wherein the step (d) includes the steps of: determining whether the representative point of the sub-pixel is positioned within a region defined by the micro-polygon or not, depending on a relative positional relationship among the representative point of the sub-pixel, the base point, and the plurality of vectors; counting the number of sub-pixels having representative points which are positioned within the region defined by the micro-polygon, based on the determination result; and calculating the area-contribution based on the counted number of sub-pixels and areas of the sub-pixels.

In another embodiment of the invention, the texture data contains an intensity value, the step (f) includes the step of: calculating a product of the area contribution and the intensity value of the texture data, only when a sum of the area contributions to the pixel is smaller than 1.

In another embodiment of the invention, the texture data contains an intensity value and an opacity, the step (f) includes the step of: calculating a product of the area contribution, the intensity value of the texture data and the opacity of the texture data, only when a sum of the area contributions to the pixel is smaller than 1.

In another embodiment of the invention, the texture data contains an intensity value and an opacity, a pixel contribution is defined as a product of the area contribution and the opacity of the texture data, the step (f) includes the step of: calculating a product of the area contribution, the intensity value of the texture data and the opacity of the texture data, only when a sum of the pixel contributions is smaller than 1.

In another embodiment of the invention, the texture data contains an intensity value and an opacity, a pixel contribution is defined as a product of the area contribution and the opacity of the texture data, the step (f) includes the step of: calculating a product of the area contribution, the intensity value of the texture data and the opacity of the texture data, only when a sum of the area contributions to the pixel is smaller than 1 and a sum of the pixel contributions is smaller than 1.

According to another aspect of the invention, an apparatus for generating an image includes: geometrical transformation means for geometrically transforming a curved surface defined in a 3-dimensional space into a curved surface in a 2-dimensional screen space; micro-polygon generating means for dividing the curved surface in the 2-dimensional screen space into a plurality of partial curved surfaces, and for generating a micro-polygon in accordance with each of the plurality of partial curved surfaces; and rendering means for rendering the micro-polygon.

According to another aspect of the invention, a method for generating an image includes the steps of: (a) geometrically transforming a curved surface defined in a 3-dimensional space into a curved surface in a 2-dimensional screen space; (b) dividing the curved surface in the 2-dimensional screen space into a plurality of partial curved surfaces; (c) generating a micro-polygon in accordance with each of the plurality of partial curved surfaces; and (d) rendering the micro-polygon.

According to the invention, micro-polygons are generated in a 2-dimensional screen space, so that the geometric transformations of a large number of micro-polygons are not required. In addition, the amount of calculation is reduced to be ⅔ when compared with the conventional method, because it is sufficient to calculate two coordinate values and components in order to determine the locations and the sizes, in the case where the micro-polygons are generated in the 2-dimensional space. Alternatively, in the case where the micro-polygons are generated in the 3-dimensional space, it is necessary to calculate three coordinate values and components in order to determine the locations and the sizes.

According to the invention, the area contributions of micro-polygons to pixels are previously stored in a table format, and an area contribution is determined based on the stored area-contribution table. Accordingly, the jittering operation is not required, so that the amount of calculation is greatly reduced.

Thus, the invention described herein makes possible the advantage of providing an apparatus and a method for generating an image for 3-dimensional computer graphics in which micro-polygons are generated in a 2-dimensional screen space, area contributions of micro-polygons to pixels are stored in a table format, and an area contribution is determined based on the stored table, so that the amount of calculation is greatly reduced, whereby a high-quality image which is comparable to those generated by the conventional method can be generated fast.

This and other advantages of the present invention will become apparent to those skilled in the art upon reading and understanding the following detailed description with reference to the accompanying figures.

BRIEF DESCRIPTION OF THE DRAWINGS

FIG. 12 is a diagram for illustrating area contributions.

FIG. 13 is a diagram for illustrating a method for generating addresses and a way in which the area contributions are referred to.

FIGS. 14A and 14B are diagrams showing the structure of addresses.

FIG. 15 is a diagram showing the structure of output data after the reference to the area contributions.

DESCRIPTION OF THE PREFERRED EMBODIMENTS

Hereinafter, an image generator in a first example of the invention will be described with reference to the relevant figures.

Figure 1:
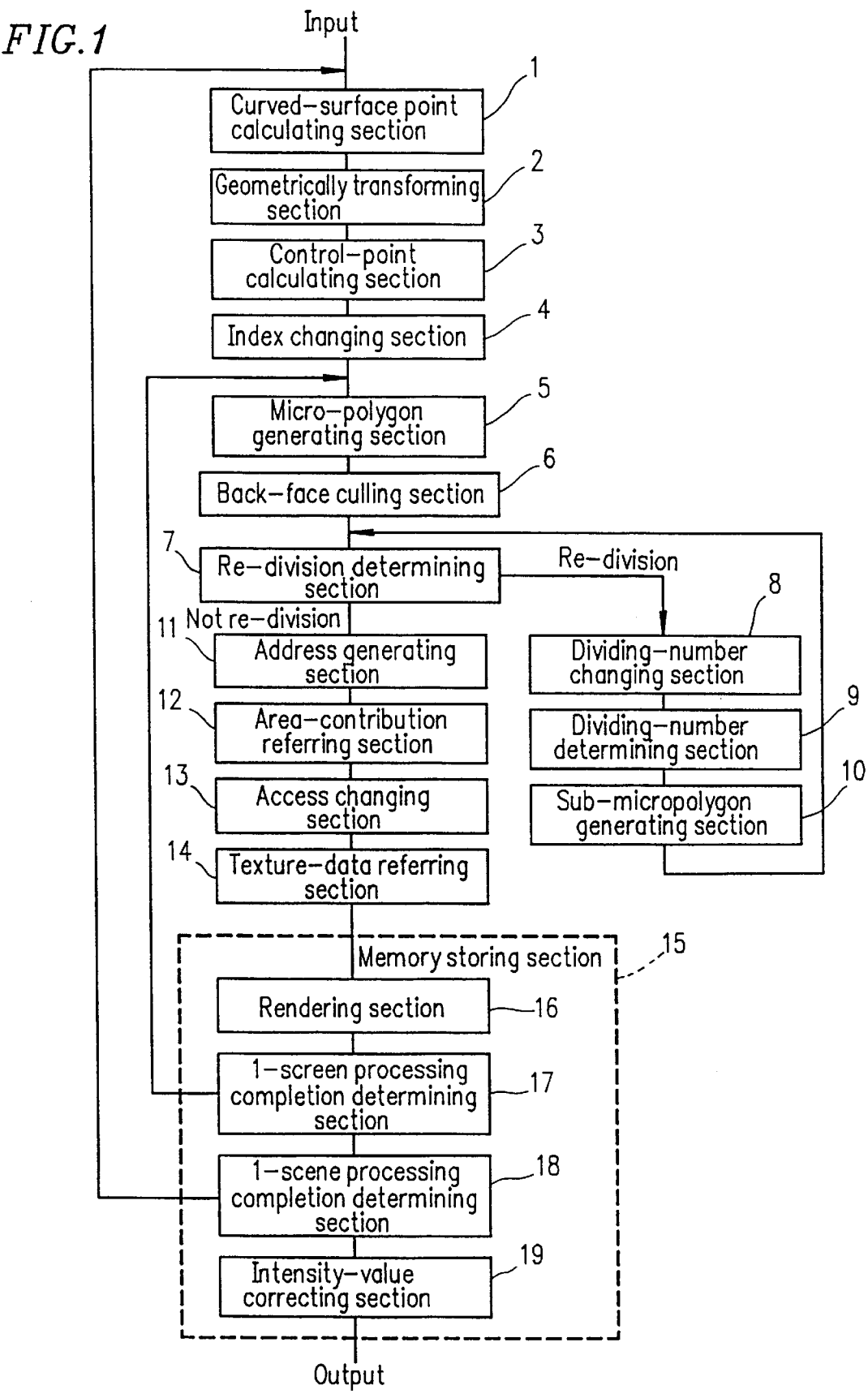
FIG. 1 is a diagram showing the construction of an image generator in a first example of the invention.

FIG. 1 shows the construction of the image generator in the first example of the invention. In FIG. 1, the image generator includes a curved-surface point calculating section 1, a geometrically transforming section 2, a control-point calculating section 3, an index changing section 4, a micro-polygon generating section 5, a back-face culling section 6, a re-division determining section 7, a dividing-number changing section 8, a dividing-number determining section 9, a sub-micropolygon generating section 10, an address generating section 11, an area-distribution referring section 12, an access changing section 13, a texture-data referring section 14, and a memory storing section 15.

The curved-surface point calculating section 1 calculates a plurality of points on a curved surface in a 3-dimensional world space in which an object is defined. The geometrically transforming section 2 performs the transformation from the 3-dimensional world space to a 2-dimensional screen space. The control-point calculating section 3 calculates a plurality of control points which define a curved surface in the 2-dimensional screen space. The index changing section 4 changes the indices of the control points. The micro-polygon generating section 5 generates micro-polygons. The back-face culling section 6 culls micro-polygons which face backward. The re-division determining section 7 determines whether the size of a micro-polygon falls within a prescribed size or not. The dividing-number changing section 8 changes the re-dividing number for re-dividing the micro-polygons. The dividing-number determining section 9 determines the re-dividing number for re-dividing the micro-polygons. The sub-micropolygon generating section 10 generates sub-micropolygons. The address generating section 11 generates addresses used when area contributions are referred to. The area-distribution referring section 12 obtains an area contribution of the micro-polygon to a pixel. The access changing section 13 changes the order of access to texture data in accordance with the generated order of the micro-polygons. The texture-data referring section 14 obtains texture data.

The memory storing section 15 performs a writing operation to a memory. The memory storing section 15 includes a rendering section 16 for performing the rendering of the micro-polygons, a one-screen process end determining section 17 for determining whether a process for one curved surface is completed or not, a one-scene process end determining section 18 for determining whether a process for one scene is completed or not, and an intensity value correcting section 19 for correcting intensity values in a memory.

The operation of the image generator having the above-described construction will be described in detail.

In this specification, the term "a curved surface" is defined as including a plane and a polygon. Hereinafter, the operation of the image generator for a Bi-cubic B-spline surface as an example of a curved surface will be described. Also, the operation of the image generator for a quadrangle polygon as an exemplary type of polygon will be described. The quadrangle polygon is a specific case of the Bi-cubic B-spline surface. However, the present invention is not limited by types of curved surfaces and types of polygons.

Figure 3:
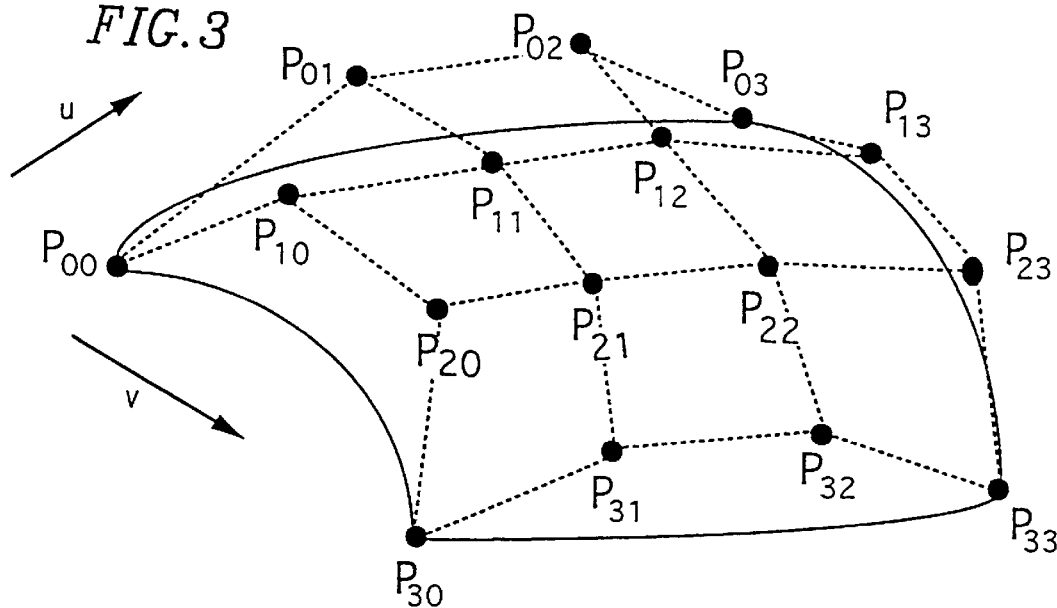
FIG. 3 is a diagram for illustrating a Bi-cubic B-spline surface.

FIG. 3 shows an exemplary Bi-cubic B-spline surface. As shown in FIG. 3, the curved surface is defined by 16 control points $P_{00}$ to $P_{03}$, $P_{10}$ to $P_{13}$, $P_{20}$ to $P_{23}$, and $P_{30}$ to $P_{33}$. An equation of the curved surface is defined for each of coordinate points independently. Each time two independent parameters u and v ($0 \leq u, v \leq 1$) are fixed, the coordinate values of a point on the curved surface are obtained. The equation of the curved surface is defined for a point (x, y, z) on the curved surface as follows:

$$x(u,v) = (1\ v\ v^2\ v^3) \begin{pmatrix} 1 & 0 & 0 & 0 \\ -3 & 3 & 0 & 0 \\ 3 & -6 & 3 & 0 \\ -1 & 3 & -3 & 1 \end{pmatrix} \begin{pmatrix} Px_{00} & Px_{01} & Px_{02} & Px_{03} \\ Px_{10} & Px_{11} & Px_{12} & Px_{13} \\ Px_{20} & Px_{21} & Px_{22} & Px_{23} \\ Px_{30} & Px_{31} & Px_{32} & Px_{33} \end{pmatrix} \times \begin{pmatrix} 1 & -3 & 3 & -1 \\ 0 & 3 & -6 & 3 \\ 0 & 0 & 3 & -3 \\ 0 & 0 & 0 & 1 \end{pmatrix} \begin{pmatrix} 1 \\ u \\ u^2 \\ u^3 \end{pmatrix} \quad (1)$$

$$y(u,v) = (1\ v\ v^2\ v^3) \begin{pmatrix} 1 & 0 & 0 & 0 \\ -3 & 3 & 0 & 0 \\ 3 & -6 & 3 & 0 \\ -1 & 3 & -3 & 1 \end{pmatrix} \begin{pmatrix} Py_{00} & Py_{01} & Py_{02} & Py_{03} \\ Py_{10} & Py_{11} & Py_{12} & Py_{13} \\ Py_{20} & Py_{21} & Py_{22} & Py_{23} \\ Py_{30} & Py_{31} & Py_{32} & Py_{33} \end{pmatrix} \times \begin{pmatrix} 1 & -3 & 3 & -1 \\ 0 & 3 & -6 & 3 \\ 0 & 0 & 3 & -3 \\ 0 & 0 & 0 & 1 \end{pmatrix} \begin{pmatrix} 1 \\ u \\ u^2 \\ u^3 \end{pmatrix} \quad (2)$$

$$z(u,v) = (1\ v\ v^2\ v^3) \begin{pmatrix} 1 & 0 & 0 & 0 \\ -3 & 3 & 0 & 0 \\ 3 & -6 & 3 & 0 \\ -1 & 3 & -3 & 1 \end{pmatrix} \begin{pmatrix} Pz_{00} & Pz_{01} & Pz_{02} & Pz_{03} \\ Pz_{10} & Pz_{11} & Pz_{12} & Pz_{13} \\ Pz_{20} & Pz_{21} & Pz_{22} & Pz_{23} \\ Pz_{30} & Pz_{31} & Pz_{32} & Pz_{33} \end{pmatrix} \times \begin{pmatrix} 1 & -3 & 3 & -1 \\ 0 & 3 & -6 & 3 \\ 0 & 0 & 3 & -3 \\ 0 & 0 & 0 & 1 \end{pmatrix} \begin{pmatrix} 1 \\ u \\ u^2 \\ u^3 \end{pmatrix} \quad (3)$$

where $Px_{00}$ to $Px_{03}$, $Px_{10}$ to $Px_{13}$, $Px_{20}$ to $Px_{23}$, and $Px_{30}$ to $Px_{33}$ are the x-coordinate values, $Py_{00}$ to $Py_{03}$, $Py_{10}$ to $Py_{13}$, $Py_{20}$ to $Py_{23}$, and $Py_{30}$ to $Py_{33}$ are the y-coordinate values, $Pz_{00}$ to $Pz_{03}$, $Pz_{10}$ to $Pz_{13}$, $Pz_{20}$ to $Pz_{23}$, and $Pz_{30}$ to $Pz_{33}$ are the z-coordinate values of the control points $P_{00}$ to $P_{03}$, $P_{10}$ to $P_{13}$, $P_{20}$ to $P_{23}$, and $P_{30}$ to $P_{33}$, respectively.

A quadrangle polygon in a 3-dimensional space having vertices given by four counterclockwise coordinate values $(x_1, y_1, z_1)$, $(x_2, y_2, z_2)$, $(x_3, y_3, z_3)$, and $(x_4, y_4, z_4)$ can be defined by Equations (1), (2), and (3), when the control points are given as follows:

$$Pw_{00} = (x_1, y_1, z_1) \quad (4)$$

$$Pw_{01} = \left(\frac{2x_1 + x_2}{3}, \frac{2y_1 + y_2}{3}, \frac{2z_1 + z_2}{3}\right) \quad (5)$$

$$Pw_{02} = \left(\frac{x_1 + 2x_2}{3}, \frac{y_1 + 2y_2}{3}, \frac{z_1 + 2z_2}{3}\right) \quad (6)$$

$$Pw_{03} = (x_2, y_2, z_2) \quad (7)$$

$$Pw_{10} = \left(\frac{2x_1 + x_4}{3}, \frac{2y_1 + y_4}{3}, \frac{2z_1 + z_4}{3}\right) \quad (8)$$

$$Pw_{11} = \left(\frac{4x_1 + 2x_2 + x_3 + 2x_4}{9}, \frac{4y_1 + 2y_2 + y_3 + 2y_4}{9}, \frac{4z_1 + 2z_2 + z_3 + 2z_4}{9}\right) \quad (9)$$

$$Pw_{12} = \left(\frac{2x_1 + 4x_2 + 2x_3 + x_4}{9}, \frac{2y_1 + 4y_2 + 2y_3 + y_4}{9}, \frac{2z_1 + 4z_2 + 2z_3 + z_4}{9}\right) \quad (10)$$

$$Pw_{13} = \left(\frac{2x_2 + x_3}{3}, \frac{2y_2 + y_3}{3}, \frac{2z_2 + z_3}{3}\right) \quad (11)$$

$$Pw_{20} = \left(\frac{x_1 + 2x_4}{3}, \frac{y_1 + 2y_4}{3}, \frac{z_1 + 2z_4}{3}\right) \quad (12)$$

$$Pw_{21} = \left(\frac{2x_1 + x_2 + 2x_3 + 4x_4}{9}, \frac{3y_1 + y_2 + 2y_3 + 4y_4}{9}, \frac{2z_1 + z_2 + 2z_3 + 4z_4}{9}\right) \quad (13)$$

-continued $$Pw_{22} = \left(\frac{x_1 + 2x_2 + 4x_3 + 2x_4}{9}, \frac{y_1 + 2y_2 + 4y_3 + 2y_4}{9}, \frac{z_1 + 2z_2 + 4z_3 + 2z_4}{9}\right) \quad (14)$$

$$Pw_{23} = \left(\frac{x_2 + 2x_3}{3}, \frac{y_2 + 2y_3}{3}, \frac{z_2 + 2z_3}{3}\right) \quad (15)$$

$$Pw_{30} = (x_4, y_4, z_4) \quad (16)$$

$$Pw_{31} = \left(\frac{2x_4 + x_3}{3}, \frac{2y_4 + y_3}{3}, \frac{2z_4 + z_3}{3}\right) \quad (17)$$

$$Pw_{32} = \left(\frac{x_4 + 2x_3}{3}, \frac{y_4 + 2y_3}{3}, \frac{z_4 + 2z_3}{3}\right) \quad (18)$$

$$Pw_{33} = (x_3, y_3, z_3) \quad (19)$$

An object in the 3-dimensional world space is composed of Bi-cubic B-spline surfaces and quadrangle polygons. These curved surfaces and polygons are previously sorted into those in a coming-closer direction and those in a moving-away direction with respect to the depth for the 2-dimensional screen space on which they are projected.

Figure 4:
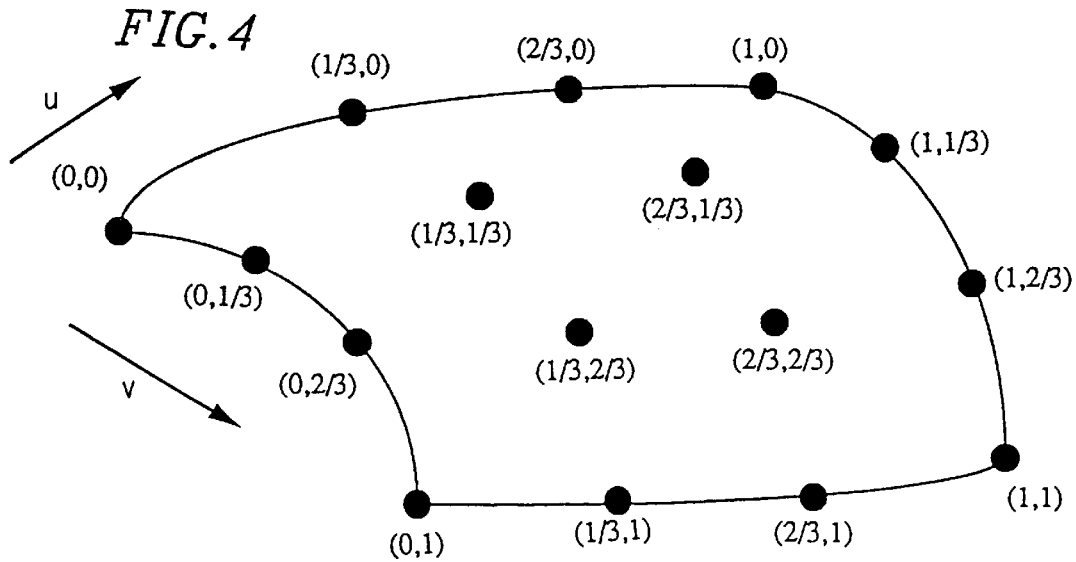
FIG. 4 is a diagram for illustrating the case where a point on a curved surface of a Bi-cubic B-spline surface is obtained.

For the Bi-cubic B-spline surface defined in the 3-dimensional world space, the curved-surface point calculating section 1 receives 16 control points $Pw_{ij}$ ($Pwx_{ij}$, $Pwy_{ij}$, $Pwz_{ij}$), where i, j=0, 1, 2, 3. Then the curved-surface point calculating section 1 calculates 16 points $Qw_{ij}$ ($Qwx_{ij}$, $Qwy_{ij}$, $Qwz_{ij}$), where i, j=0, 1, 2, 3 on the curved surface, and outputs them to the geometrically transforming section 2. For the quadrangle polygon defined by the control points described above, the curved-surface point calculating section 1 directly outputs the coordinate values of the control points to the geometrically transforming section 2 as $Qw_{ij}$. In the case of the curved surface, as is shown in FIG. 4, the relationships between the 16 points $Qw_{ij}$ on the curved surface and the parameters u and v are defined as follows:

$$Qw_{00}(Qwx_{00},Qwy_{00},Qwz_{00})=(x(0,0),y(0,0),z(0,0)) \quad (20)$$

$$Qw_{01}(Qwx_{01},Qwy_{01},Qwz_{01})=(x(1/3,0),y(1/3,0),z(1/3,0)) \quad (21)$$

$$QW_{02}(Qwx_{02},Qwy_{02},Qwz_{02})=(x(2/3,0),y(2/3,0),z(2/3,0)) \quad (22)$$

$$Qw_{03}(Qwx_{03},Qwy_{03},Qwz_{03})=(x(1,0),y(1,0),z(1,0)) \quad (23)$$

$$Qw_{10}(Qwx_{10},Qwy_{10},Qwz_{10})=(x(0,1/3),y(0,1/3),z(0,1/3)) \quad (24)$$

$$Qw_{11}(Qwx_{11},Qwy_{11},Qwz_{11})=(x(1/3,1/3),y(1/3,1/3),z(1/3,1/3)) \quad (25)$$

$$Qw_{12}(Qwx_{12},Qwy_{12},Qwz_{12})=(x(2/3,1/3),y(2/3,1/3),z(2/3,1/3)) \quad (26)$$

$$Qw_{13}(Qwx_{13},Qwy_{13},Qwz_{13})=(x(1,1/3),y(1,1/3),z(1,1/3)) \quad (27)$$

$$Qw_{20}(Qwx_{20},Qwy_{20},Qwz_{20})=(x(0,2/3),y(0,2/3),z(0,2/3)) \quad (28)$$

$$Qw_{21}(Qwx_{21},Qwy_{21},Qwz_{21})=(x(1/3,2/3),y(1/3,2/3),z(1/3,2/3)) \quad (29)$$

$$Qw_{22}(Qwx_{22},Qwy_{22},Qwz_{22})=(x(2/3,2/3),y(2/3,2/3),z(2/3,2/3)) \quad (30)$$

$$Qw_{23}(Qwx_{23},Qwy_{23},Qwz_{23})=(x(1,2/3),y(1,2/3),z(1,2/3)) \quad (31)$$

$$Qw_{30}(Qwx_{30},Qwy_{30},Qwz_{30})=(x(0,1),y(0,1),z(0,1)) \quad (32)$$

$$Qw_{31}(Qwx_{31},Qwy_{31},Qwz_{31})=(x(1/3,1),y(1/3,1),z(1/3,1)) \quad (33)$$

$$Qw_{32}(Qwx_{32},Qwy_{32},Qwz_{32})=(x(2/3,1),y(2/3,1),z(2/3,1)) \quad (34)$$

$$Qw_{33}(Qwx_{33},Qwy_{33},Qwz_{33})=(x(1,1),y(1,1),z(1,1)) \quad (35)$$

When the calculation of the coordinate values of the 16 points $Qw_{ij}$ is performed as follows:

$$Px=(Pwx_{00} \ldots Pwx_{03}\ Pwx_{10} \ldots Pwx_{13}\ Pwx_{20} \ldots Pwx_{23}\ Pwx_{30} \ldots Pwx_{33})^T \quad (36)$$

$$Py=(Pwy_{00} \ldots Pwy_{03}\ Pwy_{10} \ldots Pwy_{13}\ Pwy_{20} \ldots Pwy_{23}\ Pwy_{30} \ldots Pwy_{33})^T \quad (37)$$

$$Pz=(Pwz_{00} \ldots Pwz_{03}\ Pwz_{10} \ldots Pwz_{13}\ Pwz_{20} \ldots Pwz_{23}\ Pwz_{30} \ldots Pwz_{33})^T \quad (38)$$

$$Qx=(Qwx_{00} \ldots Qwx_{03}\ Qwx_{10} \ldots Qwx_{13}\ Qwx_{20} \ldots Qwx_{23}\ Qwx_{30} \ldots Qwx_{33})^T \quad (39)$$

$$Qy=(Qwy_{00} \ldots Qwy_{03}\ Qwy_{10} \ldots Qwy_{13}\ Qwy_{20} \ldots Qwy_{23}\ Qwy_{30} \ldots Qwy_{33})^T \quad (40)$$

$$Qz=(Qwz_{00} \ldots Qwz_{03}\ Qwz_{10} \ldots Qwz_{13}\ Qwz_{20} \ldots Qwz_{23}\ Qwz_{30} \ldots Qwz_{33})^T \quad (41)$$

$$Qx=MPx \quad (42)$$

$$Qy=MPy \quad (43)$$

$$Qz=MPz \quad (44)$$

the respective x-, y-, and z-coordinate values of the 16 points $Qw_{ij}$ are collectively obtained by multiplication of a matrix and vectors. Here, $(\ldots)^T$ represents a transposed row vector, i.e., a column vector, and wherein the matrix M is a regular 16×16 constant matrix shown below.

$$M = \begin{pmatrix} 1 & 0 & 0 & 0 & 0 & 0 & 0 & 0 & 0 & 0 & 0 & 0 & 0 & 0 & 0 & 0 \\ \frac{8}{27} & \frac{4}{9} & \frac{2}{9} & \frac{1}{27} & 0 & 0 & 0 & 0 & 0 & 0 & 0 & 0 & 0 & 0 & 0 & 0 \\ \frac{1}{27} & \frac{2}{9} & \frac{4}{9} & \frac{8}{27} & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ \frac{8}{27} & 0 & 0 & 0 & \frac{4}{9} & 0 & 0 & 0 & \frac{2}{9} & 0 & 0 & 0 & \frac{1}{27} & 0 & 0 & 0 \\ \frac{64}{729} & \frac{32}{243} & \frac{16}{243} & \frac{8}{729} & \frac{32}{243} & \frac{16}{81} & \frac{8}{81} & \frac{4}{243} & \frac{16}{243} & \frac{8}{81} & \frac{4}{81} & \frac{2}{243} & \frac{8}{729} & \frac{4}{243} & \frac{2}{243} & \frac{1}{729} \\ \frac{8}{729} & \frac{16}{243} & \frac{32}{243} & \frac{64}{729} & \frac{4}{243} & \frac{4}{81} & \frac{16}{81} & \frac{32}{243} & \frac{2}{243} & \frac{4}{81} & \frac{8}{81} & \frac{16}{243} & \frac{1}{729} & \frac{2}{243} & \frac{4}{243} & \frac{8}{729} \\ 0 & 0 & 0 & \frac{8}{27} & 0 & 0 & 0 & \frac{4}{9} & 0 & 0 & 0 & \frac{2}{9} & 0 & 0 & 0 & \frac{1}{27} \\ \frac{1}{27} & 0 & 0 & 0 & \frac{2}{9} & 0 & 0 & 0 & \frac{4}{9} & 0 & 0 & 0 & \frac{8}{27} & 0 & 0 & 0 \\ \frac{8}{729} & \frac{4}{243} & \frac{2}{243} & \frac{1}{729} & \frac{16}{243} & \frac{8}{81} & \frac{4}{81} & \frac{2}{243} & \frac{32}{243} & \frac{16}{81} & \frac{8}{81} & \frac{4}{243} & \frac{64}{729} & \frac{32}{243} & \frac{16}{243} & \frac{8}{729} \\ \frac{1}{729} & \frac{2}{243} & \frac{4}{243} & \frac{8}{729} & \frac{2}{243} & \frac{4}{81} & \frac{8}{81} & \frac{16}{243} & \frac{4}{243} & \frac{8}{81} & \frac{16}{81} & \frac{32}{243} & \frac{8}{729} & \frac{16}{243} & \frac{32}{243} & \frac{64}{729} \\ 0 & 0 & 0 & \frac{1}{27} & 0 & 0 & 0 & \frac{2}{9} & 0 & 0 & 0 & \frac{4}{9} & 0 & 0 & 0 & \frac{8}{27} \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & \frac{8}{27} & \frac{4}{9} & \frac{2}{9} & \frac{1}{27} \\ 0 & 0 & 0 & 0 & 0 & 0 & 0 & 0 & 0 & 0 & 0 & 0 & \frac{1}{27} & \frac{2}{9} & \frac{4}{9} & \frac{8}{27} \\ 0 & 0 & 0 & 0 & 0 & 0 & 0 & 0 & 0 & 0 & 0 & 0 & 0 & 0 & 0 & 0 \end{pmatrix} \quad (45)$$

The geometrically transforming section 2 receives the output of the curved-surface point calculating section 1, i.e., the points $Qw_{ij}$ ($Qwx_{ij}$, $Qwy_{ij}$, $Qwz_{ij}$), where i, j=0, 1, 2, 3. The geometrically transforming section 2 transforms the received points $Qw_{ij}$ into points $Qs_{ij}$ ($Qsx_{ij}$, $Qsy_{ij}$), where i, j=0, 1, 2, 3 on the 2-dimensional screen space, in the same way as in the usual computer graphics, and outputs the points $Qs_{ij}$ to the control-point calculating section 3. The geometric transformation is performed based on the viewpoint information (the coordinate values of a view point, a view direction vector, and an upper vector with respect to the view direction) and the information related to the screen space (the distance from the view point to the screen space, an infinite-point, a focal point, the width and height of a projection screen, and the like). The viewpoint information and the screen information are previously defined and given to the image generator.

The control-point calculating section 3 receives the output of the geometrically transforming section 2, i.e., the points $Qs_{ij}$ ($Qsx_{ij}$, $Qsy_{ij}$), where i, j=0, 1, 2, 3. For the Bi-cubic B-spline surface, the control-point calculating section 3 calculates control points $Ps_{ij}$ ($Psx_{ij}$, $Psy_{ij}$) where i, j=0, 1, 2, 3 which define the Bi-cubic B-spline surface on the screen space which includes all of the 16 points $Qs_{ij}$. The calculated control points $Ps_{ij}$ are output to the index-changing section 4. For the quadrangle polygon, the received points $Qs_{ij}$ are directly output to the index-changing section 4 as the control points $Ps_{ij}$.

When the calculation of the coordinate values of the control points $Ps_{ij}$ ($Psx_{ij}$, $Psy_{ij}$) is performed as follows:

$$Px'=(Psx_{00} \ldots Psx_{03}\ Psx_{10} \ldots Psx_{13}\ Psx_{20} \ldots Psx_{23}\ Psx_{30} \ldots Psx_{33})^T \quad (46)$$

$$Py'=(Psy_{00} \ldots Psy_{03}\ Psy_{10} \ldots Psy_{13}\ Psy_{20} \ldots Psy_{23}\ Psy_{30} \ldots Psy_{33})^T \quad (47)$$

$$Qx'=(Qsx_{00} \ldots Qsx_{03}\ Qsx_{10} \ldots Qsx_{13}\ Qsx_{20} \ldots Qsx_{23}\ Qsx_{30} \ldots Qsx_{33})^T \quad (48)$$

$$Qy'=(Qsy_{00} \ldots Qsy_{03}\ Qsy_{10} \ldots Qsy_{13}\ Qsy_{20} \ldots Qsy_{23}\ Qsy_{30} \ldots Qsy_{33})^T \quad (49)$$

the respective x-, y-, and z-coordinate values of the control points $Ps_{ij}$ are collectively obtained by the following equations:

$$Px'=M^{-1}Qx' \quad (50)$$

$$Py'=M^{-1}Qy' \quad (51)$$

Herein, $M^{-1}$ is an inverse matrix of the matrix M shown in (45) above. The elements in the respective rows of the matrix $M^{-1}$ which are obtained up to nine decimal places are described as follows in column order.

(1st Row) 1, 0, 0, 0, 0, 0, 0, 0, 0, 0, 0, 0, 0, 0, 0, 0

(2nd Row) −0.833333333, 3.000000003, −1.500000001, 0.333333333, 0, 0, 0, 0, 0, 0, 0, 0, 0, 0, 0, 0

(3rd Row) 0.333333333, −1.500000001, 3.000000003, −0.833333333, 0, 0, 0, 0, 0, 0, 0, 0, 0, 0, 0, 0

(4th Row) 0, 0, 0, 1, 0, 0, 0, 0, 0, 0, 0, 0, 0, 0, 0, 0

(5th Row) −0.833333333, 0, 0, 0, 3.000000003, 0, 0, 0, −1.500000001, 0, 0, 0, 0.333333333, 0, 0, 0

(6th Row) 0.694444462, −2.500000003, 1.250000032, −0.277777796, −2.500000033, 9.000000009, −4.500000004, 1.000000031, 1.250000032, −4.500000004, 2.2500000 02, −0.500000031, −0.277777796, 1.000000031, −0.500000031, 0.111111129

(7th Row) −0.277777796, 1.250000032, −2.500000033, 0.694444462, 1.000000031, −4.500000004, 9.000000009, −2.500000033, −0.500000031, 2.250000002, −4.500000 004, 1.250000032, 0.111111129, −0.500000031, 1.000000031, −0.27777796

(8th Row) 0, 0, 0, −0.833333333, 0, 0, 0, 3.000000003, 0, 0, 0, −1.500000001, 0, 0, 0, 0.333333333

(9th Row) 0.333333333, 0, 0, 0, −1.500000001, 0, 0, 0, 3.000000003, 0, 0, 0, −0.8333 33333, 0, 0, 0

(10th Row) −0.277777796, 1.000000031, −0.500000031, 0.111111129, 1.25000003 2, −4.500000004, 2.250000002, −0.500000031, −2.500000033, 9.000000009, −4.5000 00004, 1.000000031, 0.694444462, −2.500000033, 1.250000032, −0.277777796

(11th Row) 0.111111129, −0.500000031, 1.000000031, −0.277777796, −0.5000000 31, 2.250000002, −4.500000004, 1.250000032, 1.000000031, −4.500000004, 9.00000 0009, −2.500000033, −0.277777796, 1.250000032, −2.500000033, 0.694444462

(12th Row) 0, 0, 0, 0.333333333, 0, 0, 0, −1.500000001, 0, 0, 0, 3.000000003, 0, 0, 0, −0.833333333

(13th Row) 0, 0, 0, 0, 0, 0, 0, 0, 0, 0, 0, 0, 1, 0, 0, 0

(14th Row) 0, 0, 0, 0, 0, 0, 0, 0, 0, 0, 0, 0, −0.833333333, 3.000000003, −1.500000001, 0.333333333

(15th Row) 0, 0, 0, 0, 0, 0, 0, 0, 0, 0, 0, 0, 0.333333333, −1.500000001, 3.000000003, −0.833333333

(16th Row) 0, 0, 0, 0, 0, 0, 0, 0, 0, 0, 0, 0, 0, 0, 0, 1

Alternatively, the calculation of the coordinate values of the control points $Ps_{ij}$ can be expressed as follows using a 4×4 matrix:

$$\begin{pmatrix} Psx_{00} & Psx_{01} & Psx_{02} & Psx_{03} \\ Psx_{10} & Psx_{11} & Psx_{12} & Psx_{13} \\ Psx_{20} & Psx_{21} & Psx_{22} & Psx_{23} \\ Psx_{30} & Psx_{31} & Psx_{32} & Psx_{33} \end{pmatrix} = \begin{pmatrix} 1 & 0 & 0 & 0 \\ -\frac{5}{6} & \frac{18}{6} & -\frac{9}{6} & \frac{2}{6} \\ \frac{2}{6} & -\frac{9}{6} & \frac{18}{6} & -\frac{5}{6} \\ 0 & 0 & 0 & 1 \end{pmatrix} \begin{pmatrix} Qsx_{00} & Qsx_{01} & Qsx_{02} & Qsx_{03} \\ Qsx_{10} & Qsx_{11} & Qsx_{12} & Qsx_{13} \\ Qsx_{20} & Qsx_{21} & Qsx_{22} & Qsx_{23} \\ Qsx_{30} & Qsx_{31} & Qsx_{32} & Qsx_{33} \end{pmatrix} \times \begin{pmatrix} 1 & -\frac{5}{6} & \frac{2}{6} & 0 \\ 0 & \frac{18}{6} & -\frac{9}{6} & 0 \\ 0 & -\frac{9}{6} & \frac{18}{6} & 0 \\ 0 & \frac{2}{6} & -\frac{5}{6} & 1 \end{pmatrix} \quad (52)$$

$$\begin{pmatrix} Psy_{00} & Psy_{01} & Psy_{02} & Psy_{03} \\ Psy_{10} & Psy_{11} & Psy_{12} & Psy_{13} \\ Psy_{20} & Psy_{21} & Psy_{22} & Psy_{23} \\ Psy_{30} & Psy_{31} & Psy_{32} & Psy_{33} \end{pmatrix} = \begin{pmatrix} 1 & 0 & 0 & 0 \\ -\frac{5}{6} & \frac{18}{6} & -\frac{9}{6} & \frac{2}{6} \\ \frac{2}{6} & -\frac{9}{6} & \frac{18}{6} & -\frac{5}{6} \\ 0 & 0 & 0 & 1 \end{pmatrix} \begin{pmatrix} Qsy_{00} & Qsy_{01} & Qsy_{02} & Qsy_{03} \\ Qsy_{10} & Qsy_{11} & Qsy_{12} & Qsy_{13} \\ Qsy_{20} & Qsy_{21} & Qsy_{22} & Qsy_{23} \\ Qsy_{30} & Qsy_{31} & Qsy_{32} & Qsy_{33} \end{pmatrix} \times \begin{pmatrix} 1 & -\frac{5}{6} & \frac{2}{6} & 0 \\ 0 & \frac{18}{6} & -\frac{9}{6} & 0 \\ 0 & -\frac{9}{6} & \frac{18}{6} & 0 \\ 0 & \frac{2}{6} & -\frac{5}{6} & 1 \end{pmatrix} \quad (53)$$

$$\begin{pmatrix} Psz_{00} & Psz_{01} & Psz_{02} & Psz_{03} \\ Psz_{10} & Psz_{11} & Psz_{12} & Psz_{13} \\ Psz_{20} & Psz_{21} & Psz_{22} & Psz_{23} \\ Psz_{30} & Psz_{31} & Psz_{32} & Psz_{33} \end{pmatrix} = \begin{pmatrix} 1 & 0 & 0 & 0 \\ -\frac{5}{6} & \frac{18}{6} & -\frac{9}{6} & \frac{2}{6} \\ \frac{2}{6} & -\frac{9}{6} & \frac{18}{6} & -\frac{5}{6} \\ 0 & 0 & 0 & 1 \end{pmatrix} \begin{pmatrix} Qsz_{00} & Qsz_{01} & Qsz_{02} & Qsz_{03} \\ Qsz_{10} & Qsz_{11} & Qsz_{12} & Qsz_{13} \\ Qsz_{20} & Qsz_{21} & Qsz_{22} & Qsz_{23} \\ Qsz_{30} & Qsz_{31} & Qsz_{32} & Qsz_{33} \end{pmatrix} \times \begin{pmatrix} 1 & -\frac{5}{6} & \frac{2}{6} & 0 \\ 0 & \frac{18}{6} & -\frac{9}{6} & 0 \\ 0 & -\frac{9}{6} & \frac{18}{6} & 0 \\ 0 & \frac{2}{6} & -\frac{5}{6} & 1 \end{pmatrix} \quad (54)$$

When the value of v is fixed and the value of u is changed from 0 to 1 in Equations (1) and (2), points on the curved surface are generated in a direction from the control point $Ps_{00}$ to the control point $Ps_{03}$. When the curved surface or the polygon is sorted in the class of those in the coming-closer direction with respect to the depth in the 2-dimensional screen space, the index changing section 4 selects the deepest and the next deepest points of $Ps_{00}$, $Ps_{03}$, $Ps_{30}$, and $Ps_{33}$. Then, the indices of the control points are changed in such a manner that the selected deepest point is indicated by $Ps_{00}$, and the next deepest point is indicated by $Ps_{03}$. When the curved surface or the polygon is sorted in the class of those in the moving-away direction with respect to the depth in the 2-dimensional screen space, the index changing section 4 selects the closest and the next closest points $Ps_{00}$, $Ps_{03}$, $Ps_{30}$, and $Ps_{33}$. Then, the indices of the control points are changed in such a manner that the selected closest point is indicated by $Ps_{00}$, and the next closest point is indicated by $Ps_{03}$. There are 8 types of such changes of indices including the case of no change. The relationship with the original ($Ps_{00}$, $Ps_{03}$) is listed as follows: ($Ps_{00}$, $Ps_{03}$), ($Ps_{00}$, $Ps_{30}$), ($Ps_{30}$, $Ps_{33}$), ($Ps_{30}$, $Ps_{00}$), ($Ps_{33}$, $Ps_{30}$), ($Ps_{33}$, $Ps_{03}$), ($Ps_{03}$, $Ps_{00}$), and ($Ps_{03}$, $Ps_{33}$). The index replacement information, i.e., how the indices are changed is stored. The index replacement information indicates to which of $Ps_{00}$, $Ps_{03}$, $Ps_{30}$, and $Ps_{33}$, the original indices $Ps_{00}$ and $Ps_{03}$ are changed, respectively. Preferably, the index replacement information is stored in a memory as a table. The index replacement information is used later in the access changing section 13. The control points after the index changes are output to the micro-polygon generating section 5 as $Ps_{ij}$ ($Psx_{ij}$, $Psy_{ij}$); i, j=0, 1, 2, 3.

The micro-polygon generating section 5 divides the curved surface so as to generate divided surfaces or sub-polygons, based on the size of the texture data mapped to the curved surface or the polygon. Then, the micro-polygon generating section 5 generates a quadrangle micro-polygon, a parallelogram micro-polygon, or two triangle micro-polygons for each of the divided surfaces and the sub-polygons. The texture data, the number and the size of the texture data are previously defined and given to the image generator.

Figure 5:
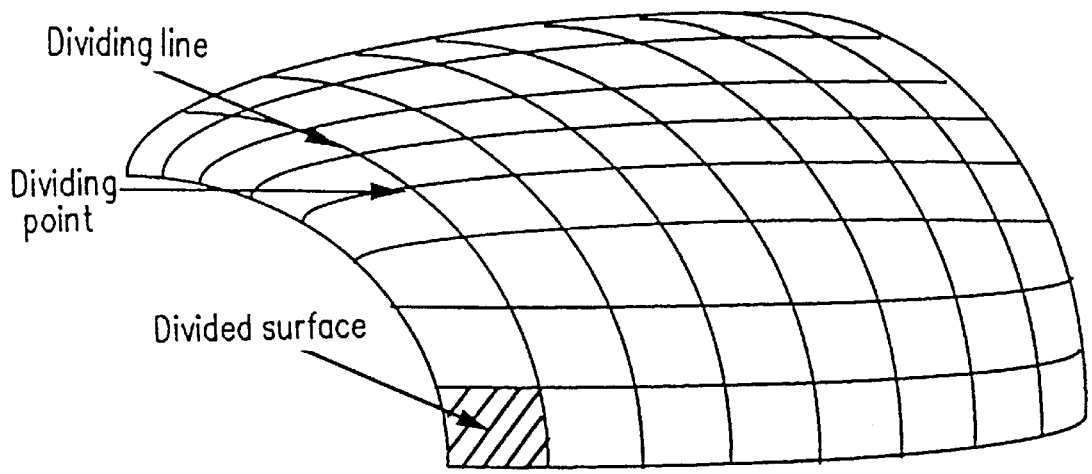
FIG. 5 is a diagram for illustrating divided surfaces.
Figure 6:
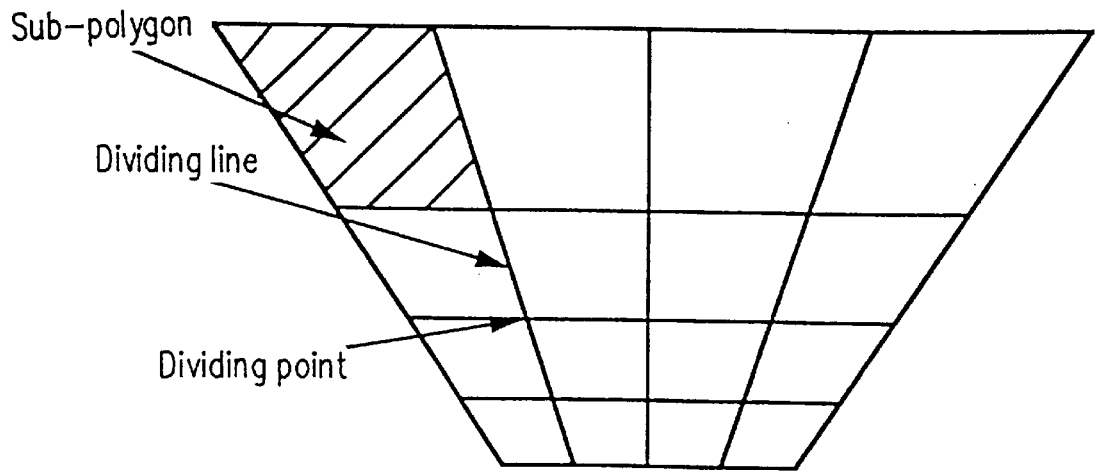
FIG. 6 is a diagram for illustrating sub-polygons.

Prior to the description of the operation of the micro-polygon generating section 5, the terms used herein are described. First, the term "a divided surface" is a part of the original curved surface obtained by dividing the original curved surface. An example of the divided surface is shown in FIG. 5. The term "a sub-polygon" is a partial plane obtained by dividing a polygon. An example of the sub-polygon is shown in FIG. 6. As seen from FIGS. 5 and 6, the divided surface and the sub-polygon are areas enclosed and defined by partial line segments of dividing lines. A crossing point of the dividing lines which corresponds to an end of a partial line segment is referred to as a dividing point.

Figure 7A:
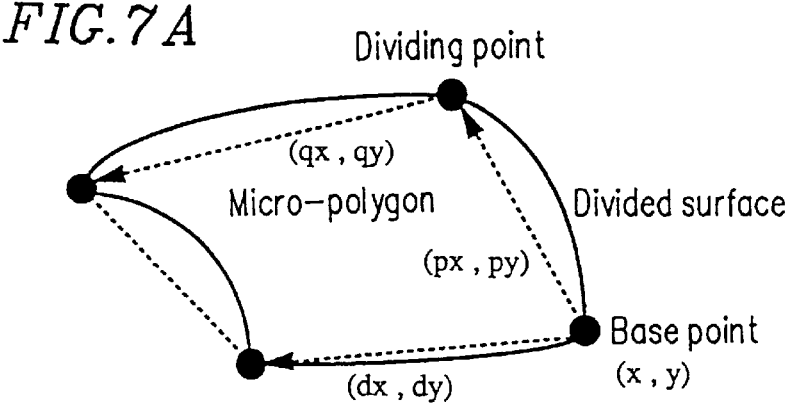
FIGS. 7A to 7C are diagrams for illustrating micro-polygons.
Figure 7B:
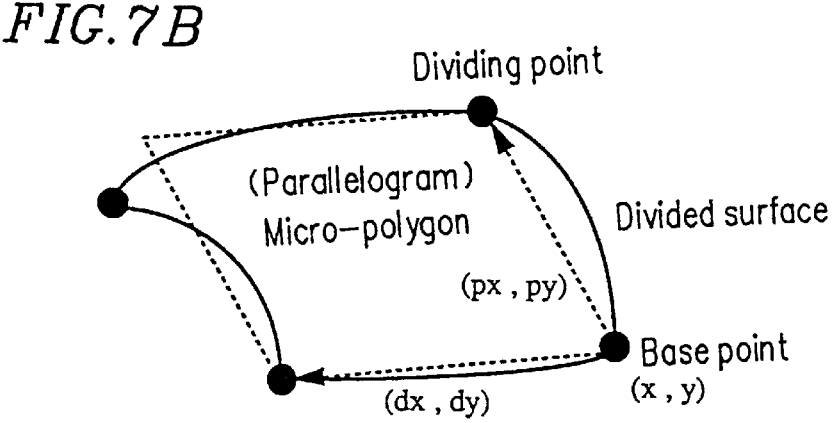
Figure 7C:
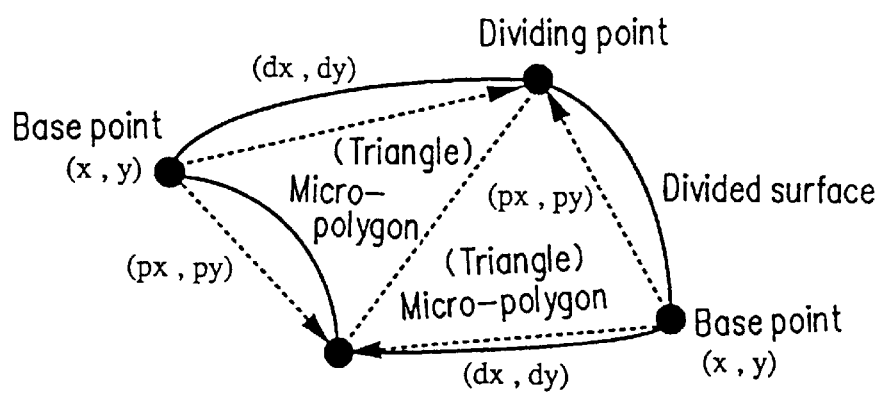

A quadrangle micro-polygon is a micro-polygon approximated as a quadrangle which is defined by four dividing points of the divided surface or the sub-polygon. The quadrangle micro-polygon is defined by a base point (x, y) and three vectors $(d_x, d_y)$, $(p_x, p_y)$, and $(q_x, q_y)$. FIG. 7A shows an exemplary quadrangle micro-polygon. A parallelogram micro-polygon is a micro-polygon approximated as a parallelogram which is defined by three of four dividing points of the divided surface or the sub-polygon. The parallelogram micro-polygon is defined by a base point (x, y) and two vectors $(d_x, d_y)$ and $(p_x, p_y)$. FIG. 7B shows an exemplary parallelogram micro-polygon. Triangle micro-polygons are micro-polygons approximated as two triangles each defined by three of four dividing points of the divided surface or the sub-polygon. Each of the triangle micro-polygons is defined by a base point (x, y) and two vectors $(d_x, d_y)$ and $(p_x, p_y)$. FIG. 7C shows exemplary triangle micro-polygons.

Next, the operation of the micro-polygon generating section 5 will be described. As described above, a micro-polygon is generated based on dividing points. Accordingly, the micro-polygon generating section 5 initially generates dividing points. The number of dividing points to be generated is determined by the size of texture. For example, if the size of texture is m times n, the micro-polygon generating section 5 generates (m+1) times (n+1) dividing points. The dividing points are generated in accordance with Equations (1) and (2). Herein, $Px_{ij}$ in Equation (1) is replaced with $Psx_{ij}$, and $Py_{ij}$ in Equation (2) is replaced with $Psy_{ij}$. Here, $Psx_{ij}$ and $Psy_{ij}$ are the coordinates of the control points output from the index changing section 4. In accordance with Equations (1) and (2), by changing the parameters u and v from 0 to 1 with respective increments of 1/m and 1/n, points on the curved surface are generated. The points on the curved surface are actually the dividing points. The generation of the dividing points can be performed by using an algorithm of a digital differential analyzer.

Hereinafter, as an example of a calculating method using Equations (1) and (2), the following method is described. In Equations (1) and (2), v is changed from 0 to 1 with an increment of 1/n. Every time when v is fixed, u is changed from 0 to 1 with an increment of 1/m, so as to generate dividing points on one line. When u reaches 1, v is incremented by 1/n, so as to generate dividing points on the next line. This operation is repeated until v=1. As a result, (m+1) times (n+1) points on the curved surface are generated. When the direction in which the texture is mapped is changed by the index changing section 4 (when the relationship between the vertical and the horizontal directions are exchanged), the increment of u is 1/n, and the increment of y is 1/m. Whether the relationship between the vertical and the horizontal directions are exchanged or not can be known from the index replacement information. If the size of texture is limited to the size which can be expressed by the power of 2, the divisions of 1/m and 1/n can be performed by shift operations. Specifically, if the texture size is $2^m \times 2^n$, the increments are $1/2^m$ and $1/2^n$, so that the calculations can be performed by the rightward shift by m bits and n bits, respectively. Hereinafter, the description is made for the case where the texture size is $2^m \times 2^n$. The coordinate values of the generated dividing points are rounded off depending on the required precision.

In order to generate a micro-polygon, it is sufficient to simultaneously store the coordinates of four dividing points. However, hereinafter, for simplifying the description, the coordinate values of all the generated dividing points are stored. It is assumed that the coordinates of the dividing points which are generated and rounded off depending on the required precision are represented by $(X_{ij}, Y_{ij})$, where $0 \leq i \leq 2^m$, and $0 \leq j \leq 2^n$.

Figure 8A:
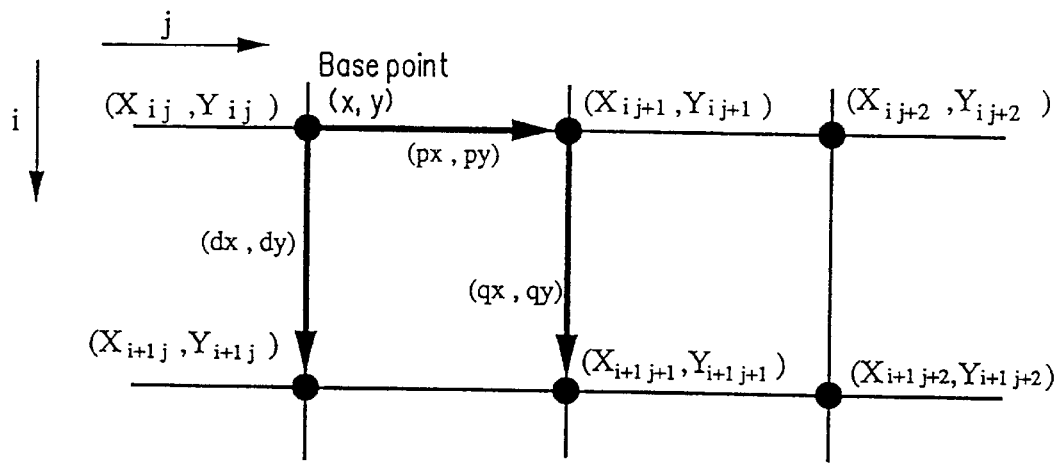
FIGS. 8A, 8B, 8C, and 8D are diagrams for explaining a method for generating micro-polygons.

First, referring to FIG. 8A, the generation of a quadrangle micro-polygon will be described. As is seen from FIG. 8A, the quadrangle micro-polygon is generated by the base point $(X_{ij}, Y_{ij})$ and the following three vectors:

$$(d_x, d_y) = (X_{i+1j} - X_{ij}, Y_{i+1j} - Y_{ij}), \quad (55)$$

$$(p_x, p_y) = (X_{ij+1} - X_{ij}, Y_{ij+1} - Y_{ij}), \quad (56)$$

$$(q_x, q_y) = (X_{i+1j+1} - X_{ij+1}, Y_{i+1j+1} - Y_{ij+1}), \quad (57)$$

where $0 \leq i \leq 2^m-1$, and $0 \leq j \leq 2^n-1$.

Figure 8B:
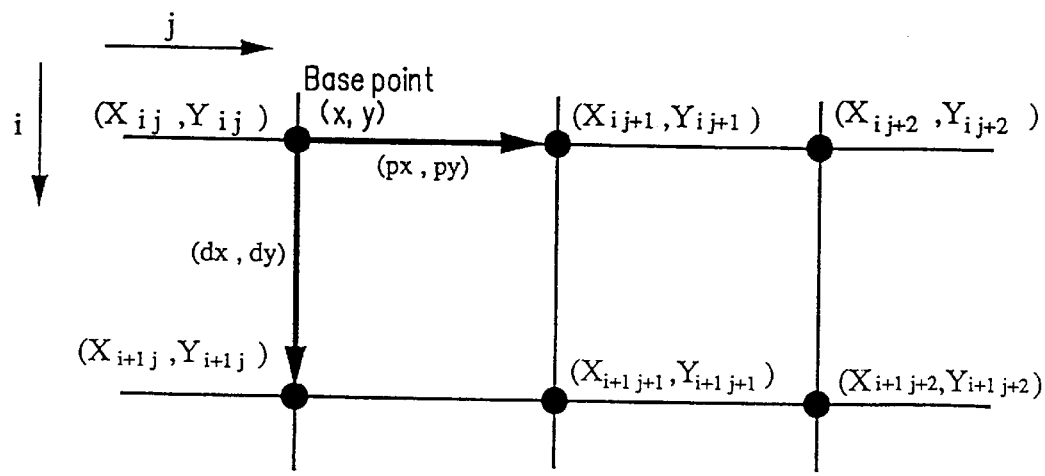
Figure 8C:
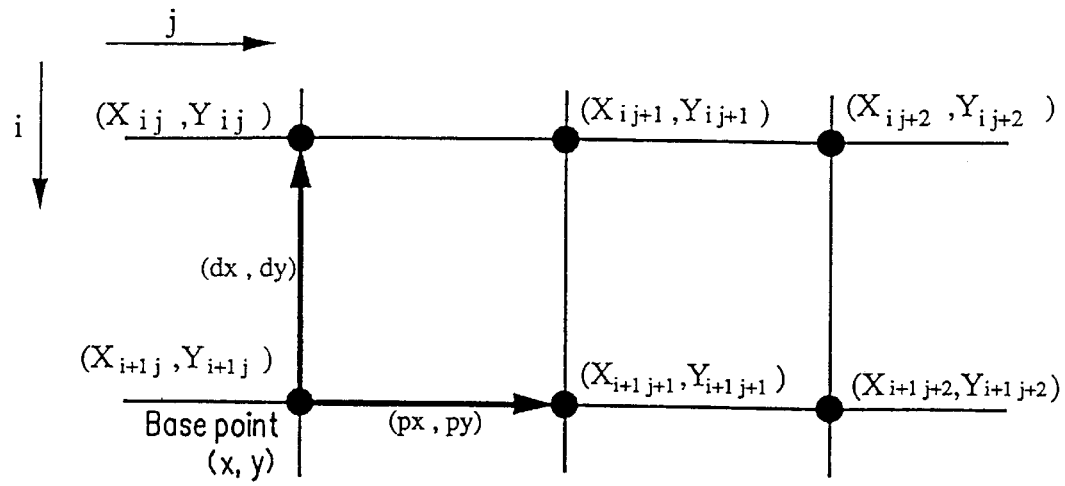

Next, referring to FIGS. 8B and 8C, the generation of a parallelogram micro-polygon will be described. As a simple generation method, as shown in FIG. 8B, the parallelogram micro-polygon is generated by the base point $(X_{ij}, Y_{ij})$ and the following two vectors:

$$(d_x, d_y) = (X_{i+1j} - X_{ij}, Y_{i+1j} - Y_{ij}), \quad (58)$$

$$(p_x, p_y) = (X_{ij+1} - X_{ij}, Y_{ij+1} - Y_{ij}), \quad (59)$$

where $0 \leq i \leq 2^m-1$, and $0 \leq j \leq 2^n-1$.

In order to increase the degree of approximation, it is preferred to generate a parallelogram micro-polygon based on the relationship in magnitude between the length $l_1$ ($=Ps_{00}Ps_{30}$) of a line segment between the control points $Ps_{00}$ and $Ps_{30}$ and the length $l_2$ ($=Ps_{03}Ps_{33}$) of a line segment between the control points $Ps_{03}$ and $Ps_{33}$. The length of a line segment (i.e., a distance between two points) can be a Euclid distance or a distance in a discrete space (an absolute value of a sum of differences between respective coordinates of two points). When $l_1 \geq l_2$, the parallelogram micro-polygon is generated by the method shown in FIG. 8B. This method is similar to the method shown in FIG. 8A. When $l_1 < l_2$, as shown in FIG. 8C, the parallelogram micro-polygon is generated by a base point $(X_{i+1j}, Y_{i+1j})$ and the following two vectors:

$$(d_x, d_y) = (X_{ij} - X_{i+1j}, Y_{ij} - Y_{i+1j}), \quad (60)$$

$$(p_x, p_y) = (X_{i+1j+1} - X_{i+1j}, Y_{i+1j+1} - Y_{i+1j}), \quad (61)$$

where $0 \leq i \leq 2^m-1$, $0 \leq j \leq 2^n-1$.

Figure 8D:
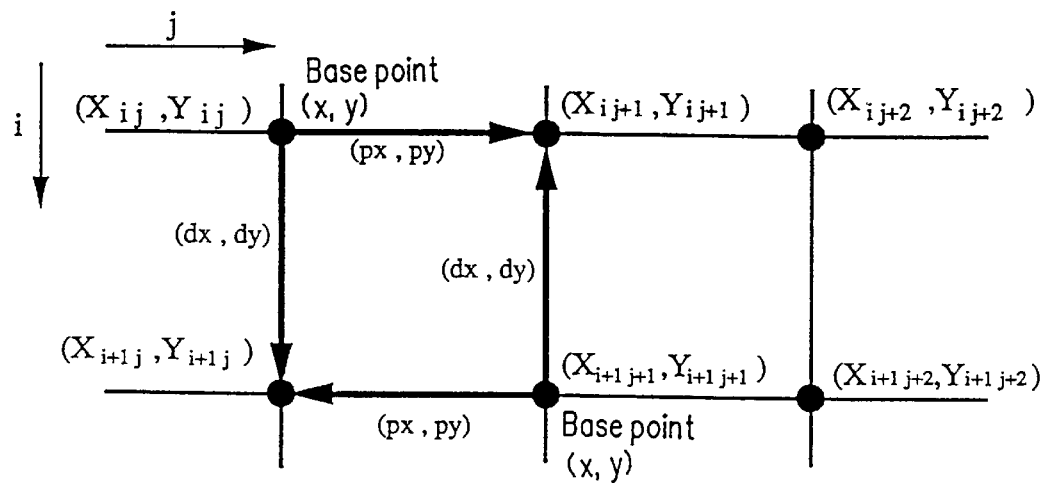

The generation of triangle micro-polygons is described with reference to FIG. 8D. As seen from FIG. 8D, two triangle micro-polygons are generated for one divided surface or one sub-polygon. One of the two triangle micro-polygons is generated by a base point $(X_{ij}, Y_{ij})$ and the following two vectors:

$$(d_x, d_y) = (X_{i+1j} - X_{ij}, Y_{i+1j} - Y_{ij}), \quad (62)$$

$$(p_x, p_y) = (X_{ij+1} - X_{ij}, Y_{ij+1} - Y_{ij}), \quad (63)$$

and the other micro-polygon is generated by a base point $(X_{i+1j}, Y_{i+1j})$ and the following two vectors:

$$(d_x, d_y) = (X_{ij} - X_{i+1j}, Y_{ij} - Y_{i+1j}), \quad (64)$$

$$(p_x, p_y) = (X_{i+1j+1} - X_{i+1j}, Y_{i+1j+1} - Y_{i+1j}), \quad (65)$$

where $0 \leq i \leq 2^m-1$, and $0 \leq j \leq 2^n-1$.

Among the micro-polygons which are generated by the above-described method, micro-polygons which do not exist within the area to be displayed in the screen space are removed for preventing them from being processed by the following operations. This corresponds to a so-called clipping process. Whether the generated micro-polygon exists inside or outside of the area to be displayed in the screen space is determined by the micro-polygon generating section 5 by referring to the above-described screen information. A micro-polygon within the area to be displayed in the screen space is output to the back-face culling section 6. The coordinate values of the four dividing points used for generating the micro-polygon should be stored for each polygon until the process in the re-division determining section 7 is completed and the coordinates are output to the address generating section 11 which will be described below.

Figure 10:
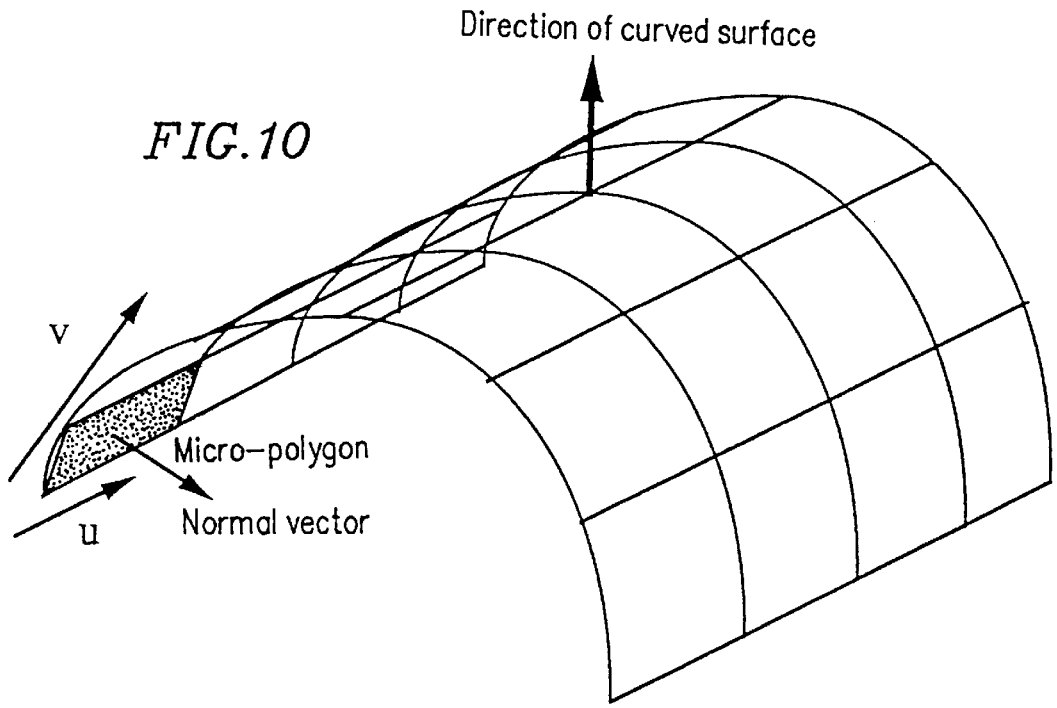
FIG. 10 is a diagram for illustrating back-face culling.
Figure 11:
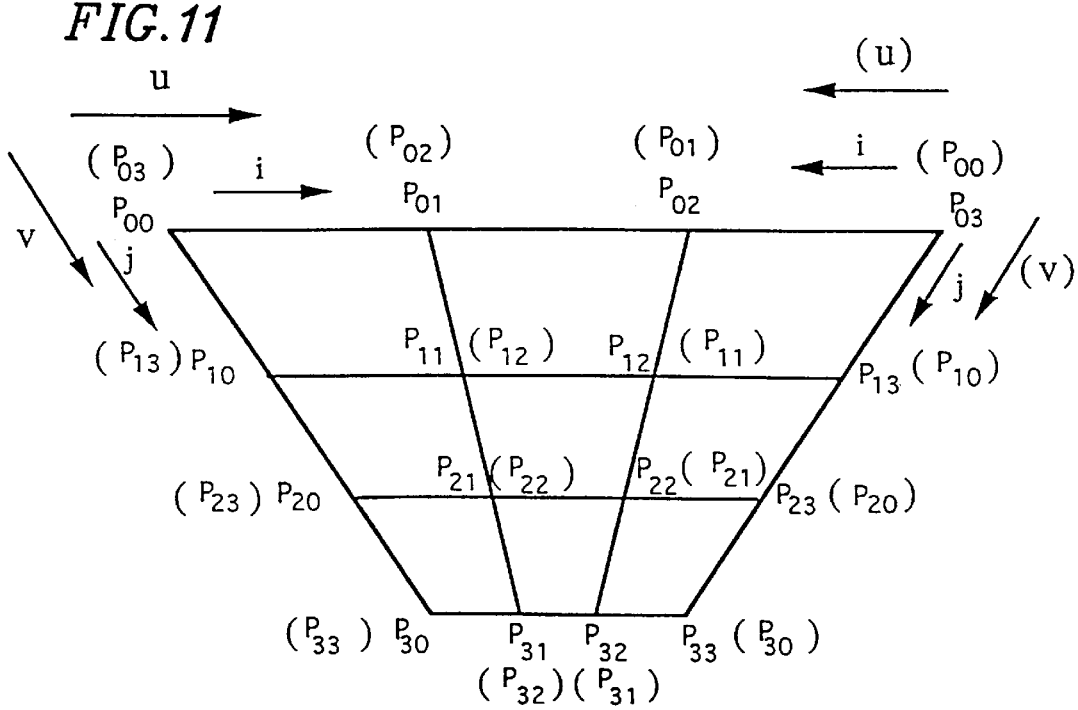
FIG. 11 is a diagram for illustrating the relationship between the arrangement of control points and the back face.

The back-face culling section 6 removes micro-polygons when a back face is to be displayed in the screen space. FIG. 10 shows the back-face culling process. In order to perform the back-face culling, it is necessary that the curved face is previously supplied with information indicating which face is the front face with respect to the arrangement of the control points of the curved surface. Specifically, in the case shown in FIG. 11, i.e., in the case of the arrangement of control points without parentheses, when the direction indicated by the rightward-type arrows is the front face, the back side of the figure paper is the front face of the curved surface. When the direction indicated by the leftward-type arrows is the front face, the front side of the figure paper is the surface of the curved surface. In the case of the arrangement of control points with parentheses, when the direction indicated by the rightward-type arrows is the front face, the front side of the figure paper is the front face of the curved surface. When the direction indicated by the leftward-type arrows is the front face, the back side of the figure paper is the front face of the curved surface. Therefore, it is assumed the curved surface is previously supplied with information related to the arrangement of control points, i.e., without parentheses or with parentheses and information related to which direction indicated by rightward-type arrows or leftward-type arrows is the front face.

By comparing the information with a sign of the outer product of (dx, dy) and (ps, py), the polygons which face backward are removed. For example, in the case where the arrangement of control points without parentheses is employed and the rightward-type direction is the surface, if the sign of an outer product of (dx, dy) and (px, py) is minus for the micro-polygons shown in FIGS. 8A, 8B, and 8D, these micro-polygons are reversed and the back faces thereof are viewed, so that the micro-polygons are removed. If the sign of an outer product of (dx, dy) and (px, py) is plus for the micro-polygon shown in FIG. 8C, the micro-polygon is removed. If the change of indices of control points is performed in the index changing section 4, the arrangement of the control points with parentheses may be changed to the arrangement of the control points without parentheses and vise versa, so that the information related to the rightward-type or the leftward-type should accordingly be reversed. The data of micro-polygons which are not removed by the backface culling section 6 is output to the re-division determining section 7.

The re-division determining section 7 determines whether the size of the generated micro-polygon is larger than a prescribed size or not. The size of the micro-polygon is not always defined uniquely. However, in general, the size of the micro-polygon is determined by the area of the micro-polygon or lengths of sides of the micro-polygon. As an example, the size of the micro-polygon is defined by the length of the side thereof. A side of a micro-polygon corresponds to the size of a vector which defines the micro-polygon. Therefore, in the case of the quadrangle micro-polygon, the sizes of the vectors (dx, dy), (px, py), and (qx, qy) are calculated and it is judged whether the calculated sizes do or do not exceed the prescribed size. In the cases of the parallelogram micro-polygon and the triangle micro-polygon, the sizes of the vectors (dx, dy) and (px, py) are calculated, and it is judged whether the calculated sizes do or do not exceed the prescribed size. Alternatively, the determination can be performed using a table. For example, the precision degrees for defining the vectors are set in units of 0.25 and a prescribed size is 1, the determination can be performed using a Checking Size Table shown in Table 1 below.

TABLE 1

Checking Size Table

| \|dx\|, \|px\|\\|dy\|, \|py\| | 0.0 | 0.25 | 0.5 | 0.75 | 1.0 | Greater than 1.0 |
| --- | --- | --- | --- | --- | --- | --- |
| 0.0 | Yes | Yes | Yes | Yes | Yes | No |
| 0.25 | Yes | Yes | Yes | Yes | No | No |
| 0.5 | Yes | Yes | Yes | Yes | No | No |
| 0.75 | Yes | Yes | Yes | No | No | No |
| 1.00 | Yes | No | No | No | No | No |
| Greater than 1.0 | No | No | No | No | No | No |

In Table 1, the numeric values in rows and columns represent the absolute values of respective vector components. In Table 1, "Yes" indicates that the size of the vector is equal to or smaller than 1, and "No" indicates that the size of the vector is larger than 1.

The data of the micro-polygon where it is determined that it has a size equal to or smaller than the prescribed size in the re-division determining section 7 is output to the address generating section 11. The micro-polygon data where it is determined that it has a size larger than the prescribed size is required to be further divided, so that the data of the micro-polygon is fed to the dividing-number changing section 8, the dividing-number determining section 9, and the sub-micropolygon generating section 10 for further processing.

Next, a series of re-division processing for micro-polygon which is recurrently performed in the dividing-number changing section 8, the dividing-number determining section 9, and the sub-micropolygon generating section 10 will be described. In the first re-division, the dividing-number changing section 8 performs no operation, and the processing is performed in the dividing-number changing section 9. The dividing-number determining section 9 determines the dividing number for the re-division based on the coordinates of the four dividing points $(X_{ij}, Y_{ij})$, $(X_{i+1j}, Y_{i+1j})$, $(X_{i+1j+1}, Y_{i+1j+1})$, and $(X_{ij+1}, Y_{ij+1})$ which have been used to generate the micro-polygon. Herein, the dividing number is limited to the number which can be expressed as the power of 2. This is for the purpose of performing a high-speed shift operation instead of the division, as described above. Accordingly, it is understood that other general numbers can be used as the dividing number in the method described herein.

The dividing-number determining section 9 first obtains the following:

$$L_1 = |X_{i+1j} - X_{ij}| + |Y_{i+1j} - Y_{ij}| \qquad (66)$$

$$L_2 = |X_{i+1j+1} - X_{i+1j}| + |Y_{i+1j+1} - Y_{i+1j}| \qquad (67)$$

$$L_3 = |X_{ij+1} - X_{i+1j+1}| + |Y_{ij+1} - Y_{i+1j+1}| \qquad (68)$$

$$L_4 = |X_{ij} - X_{ij+1}| + |Y_{ij} - Y_{ij+1}| \qquad (69)$$

Then, the dividing-number determining section 9 calculates the following:

$$L^{(1)} = \max(L_1, L_3) \tag{70}$$

$$L^{(2)} = \max(L_2, L_4) \tag{71}$$

Next, the dividing-number determining section 9 calculates the minimum non-positive integers m' and n' which satisfy the following conditions:

$$L^{(1)} \leq 2^{m'} \tag{72}$$

$$L^{(2)} \leq 2^{n'} \tag{73}$$

Figure 9:
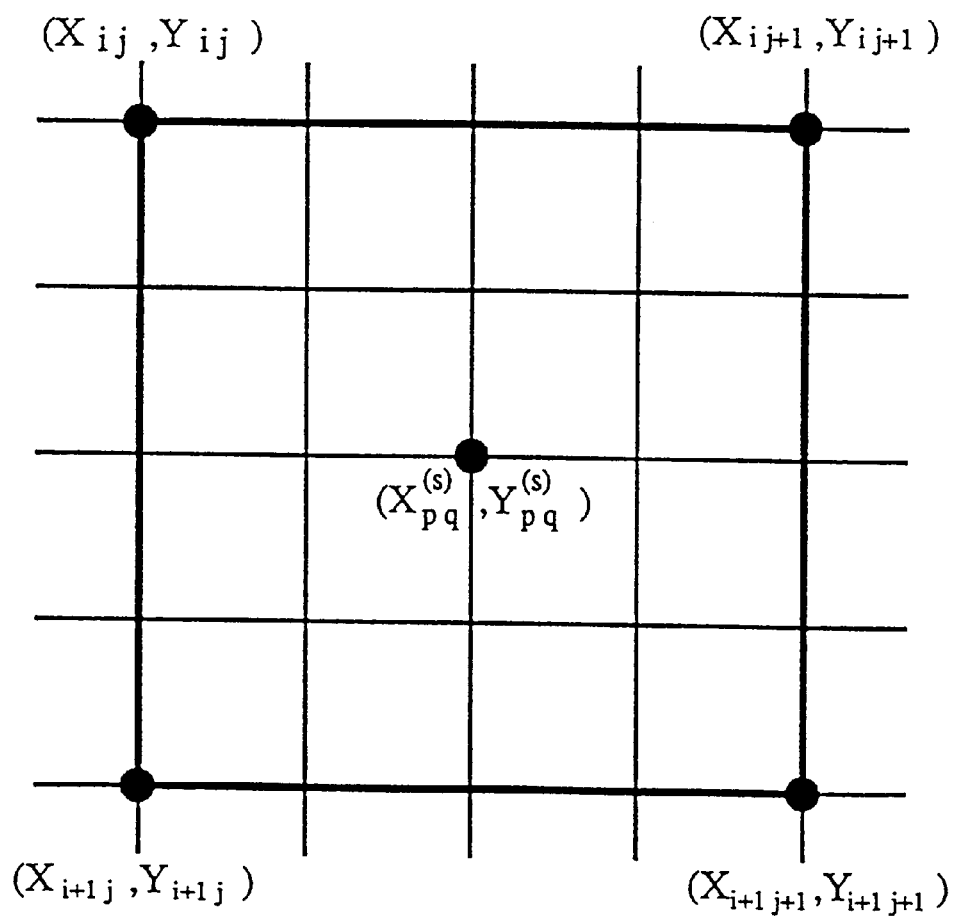
FIG. 9 is a diagram for illustrating dividing points for generating sub-micropolygons.

The integers m' and n' are the dividing numbers to be obtained. The sub-micropolygon generating section 10 generates new sets of dividing points based on the coordinates of the four dividing points corresponding to the original micro-polygon and the dividing numbers m' and n', so as to generate sub-micropolygons. The sub-micropolygons are micro-polygons obtained by dividing a micro-polygon, and hence the sub-micropolygon is the same as the micro-polygon in terms of data. When the generated dividing points are defined as follows as in FIG. 9, $$(X_{pq}^{(s)}, Y_{pq}^{(s)}), 0 \leq p \leq 2^{m'}, 0 \leq q \leq 2^{n'} \tag{74}$$

the coordinates of the dividing points can be obtained as follows:

$$X_{pq}^{(s)} = \frac{(2^{m'} - p)(2^{n'} - q)X_{ij} + p(2^{n'} - q)X_{i+1j} + q(2^{m'} - p)X_{ij+1} + pqX_{i+1j+1}}{2^{m'+n'}} \tag{75}$$

$$Y_{pq}^{(s)} = \frac{(2^{m'} - p)(2^{n'} - q)Y_{ij} + p(2^{n'} - q)Y_{i+1j} + q(2^{m'} - p)Y_{ij+1} + pqY_{i+1j+1}}{2^{m'+n'}} \tag{76}$$

The sub-micropolygon generating section 10 generates sub-micropolygons based on the obtained dividing points. The method for generating the sub-micropolygon is similar to the methods for generating a quadrangle micro-polygon, a parallelogram micro-polygon, and a triangle micro-polygon which are described for the micro-polygon generating section 5. For all of the thus generated sub-micropolygons, it is judged again whether the sizes of the sub-micropolygons do or do not exceed the prescribed size in the re-division determining section 7. When the sub-micropolygon is judged to have a size equal to or smaller than the prescribed size, the data of the sub-micropolygon is output to the address generating section 11. When the sub-micropolygon is judged to have a size larger than the prescribed size, the dividing number is changed in the dividing-number changing section 8. For example, in the cases of the parallelogram micro-polygon and the triangle micro-polygon, when the size of the vector (dx, dy) is equal to or smaller than the prescribed size and the size of the vector (px, py) is larger than the prescribed size, m' is not changed and n' is changed to n'+1. When the size of the vector (dx, dy) is larger than the prescribed size and the size of the vector (px, py) is equal to or smaller than the prescribed size, m' is changed to m'+1, and n' is not changed. When the sizes of both the vectors (dx, dy) and (px, py) are larger than the prescribed size, m' and n' are changed to m'+1 and n'+1, respectively. In the case of the quadrangle micro-polygon, the change of dividing numbers is performed in the same way as that described above. In the second and subsequent generations of the sub-micropolygon, the processing of the dividing-number determining section 9 is skipped. The sub-micropolygon generating section 10 performs the generation of sub-micropolygons using the updated dividing numbers in the same way as in the previous generation. The foregoing processes are recurrently repeated, so as to re-divide the micro-polygons and generate sub-micropolygons. Thus, the micro-polygons and the sub-micropolygons which have sizes equal to or smaller than the prescribed size are fed to the address generating section 11.

The address generating section 11 generates an address for referring to an area contribution of a micro-polygon to a pixel. The area contributions are previously set in a table format for the purpose of enabling the reference from the area-contribution referring section 12. Prior to the description of the method for generating an address, an area contribution and an area contribution table are described with reference to FIG. 13. When a pixel is assumed to be a square having one side length of 1, an area which is shared by a pixel and a micro-polygon is referred to as an area contribution of the micro-polygon to the pixel. In other words, the area contribution is a ratio of the shared area of the pixel and the micro-polygon to the area of the pixel.

In FIG. 12, an area of the hatched shared area of the pixel and the micro-polygon indicates the area contribution of the micro-polygon to each pixel. Hereinafter, it is assumed that the size of micro-polygon output from the re-division determining section 7 to the address generating section 11 is 1 or less. In the cases of the quadrangle micro-polygon and the parallelogram micro-polygon, if a base point is fixed within a center pixel of the region of 5×5 pixels, even when the vectors for defining the micro-polygon are randomly moved, the micro-polygon exists within the region of 5×5 pixels (in the case of the triangle micro-polygon, the micro-polygon exists within a region of 3×3 pixels). Furthermore, one micro-polygon falls within the region of 3×3 pixels, and the maximum number of pixels to which one micro-polygon can provide its area contributions is 6 (in the case where the size of the vector is indicated in units of 0.25). When one micro-polygon is applied to the region of 3×3 pixels, information indicating area contributions to 9 (=3×3) pixels is considered to be sufficient as the area-contribution information to pixels. The information is stored in a table format as an area-contribution table.

If 2-dimensional local coordinates are applied to the 5×5-pixel region, and the position of the 3×3-pixel region is indicated by the local coordinates of the upper-left pixel of the 3×3-pixel region, the relative position of the 3×3-pixel region to the 5×5-pixel region can be specified. FIG. 13 shows this process. The 3×3-pixel region including the micro-polygon is specified by the coordinates (0, 0) of the upper-left pixel, and the micro-polygon provides area contributions to four pixels. For a micro-polygon in a screen space, a 3×3-pixel region is segmented so as to include the micro-polygon. Then, the region is mapped to a 5×5-pixel region, and area contributions to the respective pixels in the 3×3-pixel region are obtained. Thereafter, the mapping is reversely performed to the screen space, so that the area contributions to pixels in the screen space can easily be obtained. The mapping of the 3×3-pixel region including a micro-polygon to the 5×5-pixel region is performed in such a manner that the base point is mapped within the center pixel of the 5×5-pixel region. For this purpose, the integer parts of the coordinates of the base point are converted. In order to determine at which position in the center pixel the base point is mapped, it is sufficient to know a value after the decimal point of the coordinates of the base point. The elements to define a micro-polygon are a base point and three vectors for a quadrangle micro-polygon, or two vectors for parallelogram and triangle micro-polygons. The address generating section 11 generates an address based on the base point and the vectors which define the micro-polygon. The base point can be classified using a value after a decimal point, as described above. Since the vectors have sizes equal to or smaller than the prescribed size, the vectors can be classified using combinations of respective component values. For example, as to the base point, when the unit of precision degree is 0.25, each coordinate of the base point can be one of four values, 0.0, 0.25, 0.5, or 0.75. Therefore, it is sufficient that a total of 16 kinds can be distinguishably identified. Each component of the vector can be one of 9 values, −0.1, −0.75, −0.5, −0.25, 0.0, 0.25, 0.5, 0.75, or 1.0. In the case of a quadrangle micro-polygon, it is sufficient that a total of 96 kinds can be distinguishably identified. In the case of a parallelogram and triangle micro-polygons, it is sufficient that a total of 94 kinds can be distinguishably identified. In order to distinguish the different kinds of values of the base point and the different kinds of components of the vectors, an address of total 28 bits is generated for a quadrangle micro-polygon. The address includes 4 bits for the base point (x, y) and 24 bits for three vectors (dx, dy), (px, py) and (qx, qy), as shown in FIG. 14A. For the parallelogram or triangle micro-polygon, an address of 20 bits is generated, as shown in FIG. 14B.

In view of the above description, the address generating method in the address generating section 11 will be described. It is assumed that the base point of a micro-polygon in the screen space is defined as (X, Y). First, a pixel position (I, J) is obtained from (X, Y), that is, I=[X], and J=[Y]. The notation [x] is a Gaussian symbol indicating a maximum integer which does not exceed x. Then, the local coordinates (x, y), when the base point of the micro-polygon is mapped within a center pixel (at a position (2, 2) in the local coordinate system) of the 5×5-pixel region, are obtained as follows:

$$x=X+2-Int(X) \quad (77)$$

$$y=Y+2-Int(Y) \quad (78)$$

where Int(x) indicates an integer part of x. For a quadrangle micro-polygon, an address is generated based on (x, y), (dx, dy), (px, py), and (qx, gy) by the above-described method. Similarly, for a parallelogram micro-polygon and a triangle micro-polygon, an address is generated based on (x, y), (dx, dy), and (px, py). The generated address is output to the area-contribution referring section 12.

The position of the micro-polygon in the local coordinate system is determined in accordance with the input address. Therefore, the area contributions of the micro-polygon corresponding to the input address to pixels can be previously calculated. The thus calculated area contributions are previously stored in an area contribution table. The area-contribution referring section 12 refers to the area-contribution table depending on the address generated by the address generating section 11, so as to obtain the associated area contributions.

As a result, the area-contribution referring section 12 serially outputs area contributions of the micro-polygon to 9 pixels of a 3×3-pixel region. Specifically, the area contribution to the upper-left pixel of the 3×3-pixel region having the local coordinates ($w_i$, $w_j$) is first output, and then, the area contributions to pixels having the fixed i-coordinate, i.e., $w_i$ and the increasing j-coordinates are serially output. Thereafter, the area contributions to pixels having an i-coordinate which is increased by one and the increasing j-coordinates are serially output. FIG. 15 shows an example of such a data format. Each of the values of $w_i$ and $w_j$ can be 0, 1, or 2. Accordingly, the local coordinate position ($w_i$, $w_j$) can be represented by 4 bits. If each area contribution is represented by 3 bits, data of 31 bits is output from the area-contribution referring section 12. The data is stored until the process in the memory storing section 15 is finished.

Figure 16:
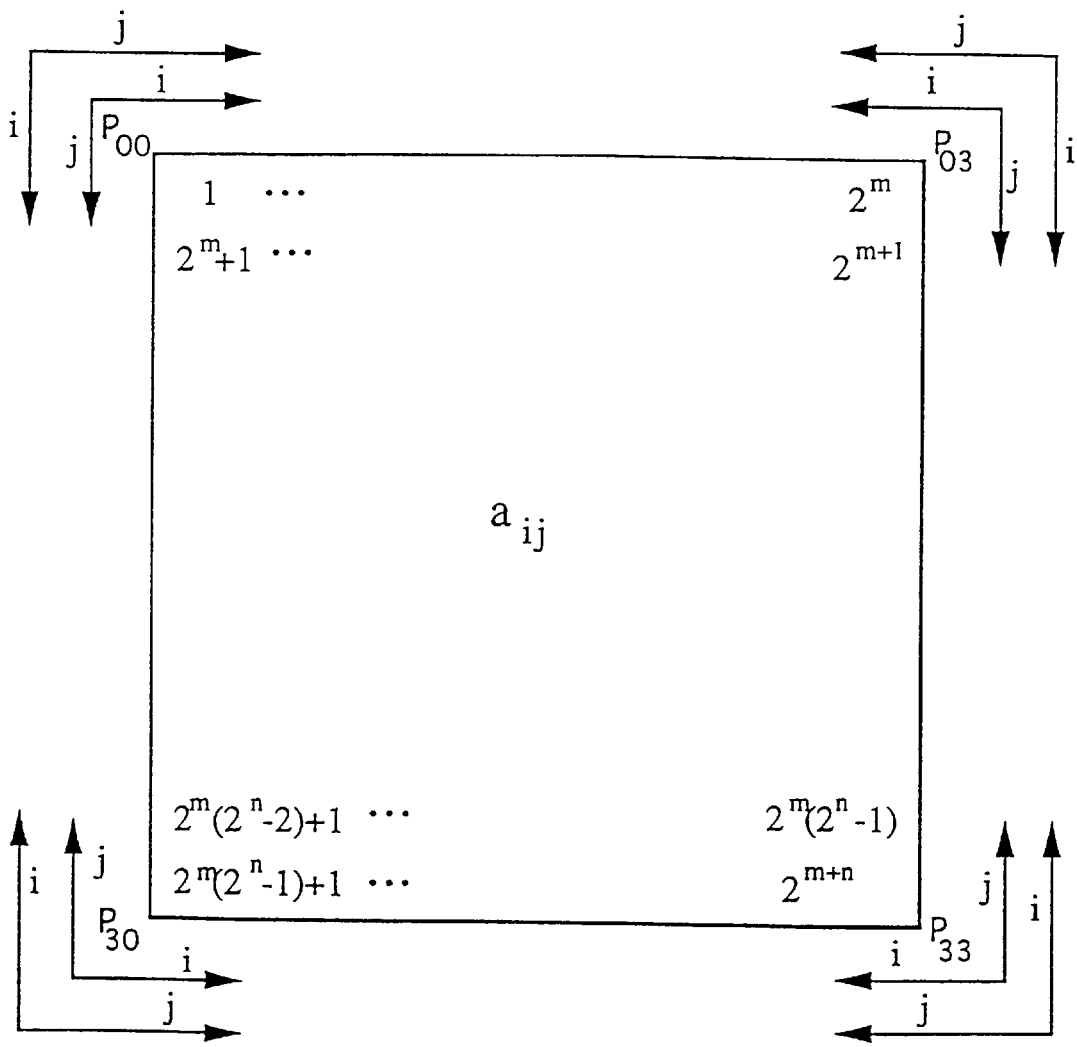
FIG. 16 is a diagram for illustrating a sequence of numbers used for access change to texture data.

The access changing section 13, based on the index replacement information generated by the index changing section 4, changes the access sequence to texture data, so that the access sequence to the texture data agrees to the direction which is originally intended to map. For example, as shown in FIG. 16, if the texture data size is $2^m \times 2^n$, and the data is one-dimensionally stored, the access sequence is changed by using any one of the following 2-dimensional sequences of numbers:

$$a_{ij}=i+2^m(j-1), i=1,2,\ldots,2^m; j=1,2,\ldots,2^n \quad (79)$$

$$a_{ij}=2^m(i-1)+j, i=1,2,\ldots,2^n; j=1,2,\ldots,2^m \quad (80)$$

$$a_{ij}=i+2^m(2^n-j), i=1,2,\ldots,2^m; j=1,2,\ldots,2^n \quad (81)$$

$$a_{ij}=2^m(2^n-i)+j, i=1,2,\ldots,2^n; j=1,2,\ldots,2^m \quad (82)$$

$$a_{ij}=-i+1+2^m(2^n-j+1), i=1,2,\ldots,2^m; j=1,2,\ldots,2^n \quad (83)$$

$$a_{ij}=2^m(2^n-i+1)-j+1, i=1,2,\ldots,2^n; j=1,2,\ldots,2^m \quad (84)$$

$$a_{ij}=-i+1+2^m j, i=1,2,\ldots,2^m; j=1,2,\ldots,2^n \quad (85)$$

$$a_{ij}=2^m i-j+1, i=1,2,\ldots,2^n; j=1,2,\ldots,2^m \quad (86)$$

The above-mentioned sequences of numbers are used while increasing the value of i for every changed value of j, and the calculated value $a_{ij}$ is the number of the texture to be accessed for the micro-polygon. The original ($Ps_{00}$, $Ps_{03}$) can be changed to ($Ps_{00}$, $Ps_{03}$), ($Ps_{00}$, $Ps_{30}$), ($Ps_{30}$, $Ps_{33}$), ($Ps_{30}$, $Ps_{00}$), ($Ps_{33}$, $Ps_{30}$), ($Ps_{33}$, $Ps_{03}$), ($Ps_{03}$, $Ps_{00}$), ($Ps_{03}$, $Ps_{33}$) in the index changing section 4. In this correspondence, the sequences of numbers (79), (80), (81), (82), (83), (84), (85), and (86) are used for calculating the number to be accessed.

The texture-data referring section 14 acquires texture data in accordance with the number of the texture to be accessed for the micro-polygon which is calculated by the access changing section 13. The texture data basically includes RGB intensity values, the opacity of the object, and the like. The RGB intensity data of the texture data to be employed reflects the calculated result of the illumination intensity. That is, the RGB intensity data reflects the result calculated by various illumination intensity calculating methods (glow, phone, radiosity, etc.). As for the curved surface and polygon which are used for representing the shadow, a so-called shadow mapping can be performed if data containing the shadow illumination value is used.

The memory storing section 15 includes a rendering section 16, a one-screen processing completion determining section 17, a one-scene processing completion determining section 18, and an intensity value correcting section 19. By using the area contributions to pixels and the texture data which are referred to by the area-contribution referring section 12 and the texture-data referring section 14, the rendering of a micro-polygon, the storing of data into a memory, the determination of processing completion, and the like are performed. The rendering of a micro-polygon is a flat shading. That is, the calculation is performed so that the micro-polygon is uniformly colored with the RGB values applied as the texture data. The processing method in the memory storing section 15 depends on the sorting order initially applied to the curved surface and polygon. Also, the processing method in the memory storing section 15 depends on whether the opacity is included in the texture data or not. Hereinafter, the processing method is described.

First, the first, second, third, and fourth processing methods in the memory storing section 15 in the case where the sorting is performed into those in the coming-closer direction with respect to the depth are described.

The first processing method is applied to the case where the texture data contains no opacity. The rendering section 16 includes a memory for storing a rendering intensity value, a calculating intensity value, and a sum of area contributions for each pixel in the screen space coordinate system. It is assumed that the rendering intensity value and the calculating intensity value are both 3-dimensional data of RGB type. Since one pixel is supplied with area contributions by a plurality of micro-polygons, the area contributions for the pixel are summed, so as to obtain the sum of area contributions. The rendering section 16 calculates the rendering intensity value, the calculating intensity value, and the sum of area contributions, on the bases of the area contributions of one micro-polygon to 9 pixels output from the area-contribution referring section 12 and the texture data output from the texture-data referring section 14. Then, the rendering section 16 performs the reading, modifying, and writing operations to the memory. The calculating intensity value is a temporary value used for calculating the rendering intensity value. As described above with reference to FIG. 15, the area contributions output from the area-contribution referring section 12 is the data based on the 5×5-pixel local coordinate system. Accordingly, it is necessary to convert the data into data based on the screen space coordinate system. The conversion is performed as follows using I and J which are described for the operation of the address generating section 11. It is noted that the coordinates of the pixel to be accessed in the screen space is represented by (Iw, Jw).

If $(w_i, w_j)=(0, 0)$, a pixel positioned at $I-2 \leq Iw \leq I$ and $J-2 \leq Jw \leq J$ is accessed.

If $(w_i, w_j)=(0, 1)$, a pixel positioned at $I-2 \leq Iw \leq I$ and $J-1 \leq Jw \leq J+1$ is accessed.

If $(w_i, w_j)=(0, 2)$, a pixel positioned at $I-2 \leq Iw \leq I$ and $J \leq Jw \leq J+2$ is accessed.

If $(w_i, w_j)=(1, 0)$, a pixel positioned at $I-1 \leq Iw \leq I+1$ and $J-2 \leq Jw \leq J$ is accessed.

If $(w_i, w_j)=(1, 1)$, a pixel positioned at $I-1 \leq Iw \leq I+1$ and $J-1 \leq Jw \leq J+1$ is accessed.

If $(w_i, w_j)=(1, 2)$, a pixel positioned at $I-1 \leq Iw \leq I+1$ and $J \leq Jw \leq J+2$ is accessed.

If $(w_i, w_j)=(2, 0)$, a pixel positioned at $I \leq Iw \leq I+2$ and $J-2 \leq Jw \leq J$ is accessed.

If $(w_i, w_j)=(2, 1)$, a pixel positioned at $I \leq Iw \leq I+2$ and $J-1 \leq Jw \leq J+1$ is accessed.

If $(w_i, w_j)=(2, 2)$, a pixel positioned at $I \leq Iw \leq I+2$ and $J \leq Jw \leq J+2$ is accessed.

These pixels are processed by the rendering section 16 as described below. First, the sum of area contributions $\alpha_{sum}$ of a pixel to be processed is read out from the memory. Only when the sum $\alpha_{sum}$ is smaller than 1, a temporary value (Temp) is calculated by adding the area contribution $\alpha$ calculated by the area-contribution referring section 12 to the sum $\alpha_{sum}$, i.e., Temp=$\alpha_{sum}+\alpha$.

(1) If the temporary value is equal to or smaller than 1 (Temp$\leq$1):

The sum of the area contributions is updated to be Temp. The calculating intensity value is updated to be a value which is obtained by adding a product of a and the intensity value $(I_R, I_G, I_B)$ which is referred to by the texture-data referring section 14 to the calculating intensity value $(I_{calR}, I_{calG}, I_{calB})$ which is read out from the memory:

(Calculating intensity value)=$\alpha(I_R, I_G, I_B)+(I_{calR}, I_{calG}, I_{calB})$ (87)

(2) If the temporary value is larger than 1 (Temp>1):

The calculating intensity value is updated to be the following value, and the sum of area contributions is updated to be 1:

(Calculating intensity value)=$(1-\alpha_{sum})(I_R, I_G, I_B)+(I_{calR}, I_{calG}, I_{calB})$ (88)

The one-screen processing completion determining section 17 determines whether the processing to all of the micro-polygons generated for one polygon or curved surface is completed or not. If the processing is not completed, the foregoing processes are repeatedly performed until all of the micro-polygons generated for on polygon or curved surface are processed. If it is determined that the processing is completed, the rendering intensity value is updated to be the following value using the rendering intensity value $(Id_R, Id_G, Id_B)$ which is read out from the memory:

(Rendering intensity value)=$(1-\alpha_{sum})(Id_R, Id_G, Id_B)+(I_{calR}, I_{calG}, I_{calB})$ (89)

When the update is finished, the calculating intensity value and the sum of area contributions are initialized to be 0. The aforementioned processing is repeatedly performed until the one-scene processing completion determining section 18 determines that the processing to all data for one scene is completed. In this first method, the intensity-value correcting section 19 has no function.

The second processing method is applied to the case where the texture data contains opacity. A value obtained by multiplying an area contribution by the opacity is defined as a pixel contribution. The rendering section 16 includes a memory for storing a rendering intensity value, a calculating intensity value, a sum of area contributions, and a sum of pixel contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of area contributions $\alpha_{sum}$ of a pixel to be processed from the memory. Only when the sum $\alpha_{sum}$ is smaller than 1, a temporary value (Temp) is calculated by adding the area contribution $\alpha$ calculated by the area-contribution referring section 12 to the sum $\alpha_{sum}$, i.e., Temp=$\alpha_{sum}+\alpha$.

(1) If the temporary value is equal to or smaller than 1 (Temp$\leq$1):

is The sum of the area contributions is updated to be Temp. The sum of pixel contributions is updated to be a value obtained by adding a product of the opacity $\beta$ which is referred to by the texture-data referring section 14 and the calculated area contribution $\alpha$ to the sum of pixel contributions $\gamma$ which is read out from the memory:

(Sum of pixel contributions)=$\alpha\beta+\gamma$ (90)

The calculating intensity value is updated to be a value obtained by adding a product of $\alpha$, $\beta$, and the intensity value $(I_R, I_G, I_B)$ which is referred to by the texture-data referring section 14 to the calculating intensity value ($I_{calR}$, $I_{calG}$, $I_{calB}$) which is read out from the memory:

(Calculating intensity value)=$\alpha\beta(I_R, I_G, I_B)+(I_{calR}, I_{calG}, I_{calB})$ (91)

(2) If the temporary value is larger than 1 (Temp>1):
The calculating intensity value is updated to be the following value:

(Calculating intensity value)=$(1-\alpha)\beta(I_R, I_G, I_B)+(I_{calR}, I_{calG}, I_{calB})$ (92)

The sum of area contributions is updated to be 1. The sum of pixel contributions is updated to be the following value:

(Sum of pixel contributions)=$(1-\alpha_{sum})\beta+\gamma$ (93)

The one-screen processing completion determining section 17 determines whether the processing to all of the micro-polygons generated for one polygon or curved surface is completed or not. If the processing is not completed, the foregoing processes are repeatedly performed until all of the micro-polygons generated for on polygon or curved surface are processed. If it is determined that the processing is completed, the rendering intensity value is updated to be the following value using the rendering intensity value ($Id_R$, $Id_G$, $Id_B$) which is read out from the memory:

(Rendering intensity value)=$(1-\gamma)(Id_R, Id_G, Id_B)+(I_{calR}, I_{calG}, I_{calB})$ (94)

When the update is finished, the calculating intensity value, the sum of area contributions, and the sum of pixel contributions are initialized to be 0. The aforementioned processing is repeatedly performed until the one-scene processing completion determining section 18 determines that the processing to all data for one scene is completed. In this second method, the intensity-value correcting section 19 has no function.

The third processing method is applied to the case where the texture data contains no opacity. The rendering section 16 includes a memory for storing a rendering intensity value, a calculating intensity value, and a sum of area contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of area contributions $\alpha_{sum}$ of a pixel to be processed from the memory. Only when the sum $\alpha_{sum}$ is smaller than 1, a temporary value (Temp) is calculated by adding the area contribution $\alpha$ calculated by the area-contribution referring section 12 to the sum $\alpha_{sum}$, i.e., Temp=$\alpha_{sum}+\alpha$.

(1) If the temporary value is equal to or smaller than 1 (Temp≦1):
The sum of the area contributions is updated to be Temp. The calculating intensity value is updated to be a value which is obtained in the following manner: the intensity value ($I_R$, $I_G$, $I_B$) which is referred to by the texture-data referring section 14 is first subtracted from the rendering intensity value ($Id_R$, $Id_G$, $Id_B$) which is read out from the memory; the subtracted result is then multiplied by $\alpha$; and the multiplied result is subtracted from the calculating intensity value ($I_{calR}$, $I_{calG}$, $I_{calB}$) read out from the memory:

(Calculating intensity value)=$(I_{calR}, I_{calG}, I_{calB})-\alpha\{(Id_R, Id_G, Id_B)-(I_R, I_G, I_B)\}$ (95)

(2) If the temporary value is larger than 1 (Temp>1):
The calculating intensity value is updated to be the following value, and the sum of area contributions is updated to be 1:

(Calculating intensity value)=$(I_{calR}, I_{calG}, I_{calB})-(1-\alpha_{sum})\{(Id_R, Id_G, Id_B)-(I_R, I_G, I_B)\}$ (96)

The one-screen processing completion determining section 17 determines whether the processing to all of the micro-polygons generated for one polygon or curved surface is completed or not. If the processing is not completed, the foregoing processes are repeatedly performed until all of the micro-polygons generated for on polygon or curved surface are processed. If it is determined that the processing is completed, the rendering intensity value is updated to be the calculating intensity value. When the update is finished, the calculating intensity value, and the sum of area contributions are initialized to be 0. The aforementioned processing is repeatedly performed until the one-scene processing completion determining section 18 determines that the processing to all data for one scene is completed. In this third method, the intensity-value correcting section 19 has no function.

The fourth processing method is applied to the case where the texture data contains opacity. The rendering section 16 includes a memory for storing a rendering intensity value, a calculating intensity value, and a sum of area contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of area contributions $\alpha_{sum}$ of a pixel to be processed from the memory. Only when the sum $\alpha_{sum}$ is smaller than 1, a temporary value (Temp) is calculated by adding the area contribution $\alpha$ calculated by the area-contribution referring section 12 to the sum $\alpha_{sum}$, i.e., Temp=$\alpha_{sum}+\alpha$.

(1) If the temporary value is equal to or smaller than 1 (Temp≦1):
The sum of the area contributions is updated to be Temp. The calculating intensity value is updated to be a value which is obtained in the following manner: the intensity value ($I_R$, $I_G$, $I_B$) which is referred to by the texture-data referring section 14 is first subtracted from the rendering intensity value ($Id_R$, $Id_G$, $Id_B$) which is read out from the memory; the subtracted result is then multiplied by $\alpha$ and the opacity $\beta$ which is referred to by the texture-data referring section 14; and the multiplied result is subtracted from the calculating intensity value ($I_{calR}$, $I_{calG}$, $I_{calB}$) read out from the memory:

(Calculating intensity value)=$(I_{calR}, I_{calG}, I_{calB})-\alpha\beta\{(Id_R, Id_G, Id_B)-(I_R, I_G, I_B)\}$ (97)

(2) If the temporary value is larger than 1 (Temp>1):
The calculating intensity value is updated to be the following value, and the sum of area contributions is updated to be 1:

(Calculating intensity value)=$(I_{calR}, I_{calG}, I_{calB})(1-\alpha_{sum})\beta\{(Id_R, Id_G, Id_B)-(I_R, I_G, I_B)\}$ (98)

The one-screen processing completion determining section 17 determines whether the processing to all of the micro-polygons generated for one polygon or curved surface is completed or not. If the processing is not completed, the foregoing processes are repeatedly performed until all of the micro-polygons generated for on a polygon or curved surface are processed. If it is determined that the processing is completed, the rendering intensity value is updated to be the calculating intensity value. When the update is finished, the calculating intensity value, and the sum of area contributions are initialized to be 0. The aforementioned processing is repeatedly performed until the one-scene processing completion determining section 18 determines that the processing to all data for one scene is completed. In this fourth method, the intensity-value correcting section 19 has no function.

Next, the fifth, sixth, and seventh processing methods in the memory storing section 15 in the case where the sorting is performed into those in the moving-away direction with respect to the depth are described.

The fifth processing method is applied to the case where the texture data contains no opacity. The rendering section 16 includes a memory for storing an intensity value and a sum of area contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of area contributions $\alpha_{sum}$ of a pixel to be processed from the memory. Only when the sum $\alpha_{sum}$ is smaller than 1, a temporary value (Temp) is calculated by adding the area contribution $\alpha$ calculated by the area-contribution referring section 12 to the sum $\alpha_{sum}$, i.e., Temp=$\alpha_{sum}$+$\alpha$.

(1) If the temporary value is equal to or smaller than 1 (Temp≦1):

The sum of the area contributions is updated to be Temp. The intensity value is updated to be a value which is obtained in the following manner: the intensity value ($I_R$, $I_G$, $I_B$) which is referred to by the texturedata referring section 14 is first multiplied by $\alpha$; and then the multiplied result is added to the intensity value ($Id_R$, $Id_G$, $Id_B$) which is read out from the memory:

$$(\text{Intensity value})=\alpha(I_R, I_G, I_B)+(Id_R, Id_G, Id_B) \qquad (99)$$

(2) If the temporary value is larger than 1 (Temp>1):

The intensity value is updated to be the following value, and the sum of area contributions is updated to be 1:

$$(\text{Intensity value})=(1-\alpha_{sum})(I_R, I_G, I_B)+(Id_R, Id_G, Id_B) \qquad (100)$$

The aforementioned processing is repeatedly performed until the one-scene processing completion determining section 18 determines that the processing to all data for one scene is completed. If the one-scene processing completion determining section 18 determines that the processing is completed, the intensity-value correcting section 19 updates, for a pixel having an area contribution smaller than 1, the intensity value to be a value obtained as follows: the sum of area contributions is subtracted from 1; the subtracted result is multiplied by the intensity value ($Ib_R$, $Ib_G$, $Ib_B$) which is applied as a background; and the multiplied result is added to the stored intensity value ($Id_R$, $Id_G$, $Id_B$):

$$(\text{Intensity value})=(Id_R, Id_G, Id_B)+(1-\alpha)(Ib_R, Ib_G, Ib_B) \qquad (101)$$

The sixth processing method is applied to the case where the texture data contains opacity. The rendering section 16 includes a memory for storing an intensity value and a sum of pixel contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of pixel contributions $\gamma_{sum}$ of a pixel to be processed from the memory. Only when the sum $\gamma_{sum}$ is smaller than 1, a temporary value (Temp) is calculated by adding $\gamma_{sum}$ to a product of the area contribution $\alpha$ calculated in the area-contribution referring section 12 and the opacity $\beta$ which is referred to by the texture-data referring section 14, i.e., Temp=$\gamma_{sum}$+$\alpha\beta$.

(1) If the temporary value is equal to or smaller than 1 (Temp≦1):

The sum of the pixel contributions $\gamma_{sum}$ is updated to be Temp. The intensity value is updated to be a value which is obtained in the following manner: a product of $\alpha$ and $\beta$ is multiplied by the intensity value ($I_R$, $I_G$, $I_B$) which is referred to by the texture-data referring section 14; and the multiplied result is added to the intensity value ($Id_R$, $Id_G$, $Id_B$) which is read out from the memory:

$$(\text{Intensity value})=\alpha\beta(I_R, I_G, I_B)+(Id_R, Id_G, Id_B) \qquad (102)$$

(2) If the temporary value is larger than 1 (Temp>1):

The intensity value is updated to be the following value, and the sum of pixel contributions is updated to be 1:

$$(\text{Intensity value})=(1-\gamma_{sum})(I_R, I_G, I_B)+(Id_R, Id_G, Id_B) \qquad (103)$$

The aforementioned processing is repeatedly performed until the one-scene processing completion determining section 18 determines that the processing to all data for one scene is completed. If the one-scene processing completion determining section 18 determines that the processing is completed, the intensity-value correcting section 19 updates, for a pixel having an area contribution smaller than 1, the intensity value to be a value obtained as follows: the sum of pixel contributions is subtracted from 1; the subtracted result is multiplied by the intensity value ($Ib_R$, $Ib_G$, $Ib_B$) which is applied as a background; and the multiplied result is added to the stored intensity value ($Id_R$, $Id_G$, $Id_B$):

$$(\text{Intensity value})=(Id_R, Id_G, Id_B)+(1-\gamma_{sum})(Ib_R, Ib_G, Ib_B) \qquad (104)$$

The seventh processing method is applied to the case where the texture data contains opacity. The rendering section 16 includes a memory for storing an intensity value and a sum of pixel contributions for each pixel, and a memory for storing a sum of area contributions for each pixel. The method for converting the coordinates in the 5×5-pixel region into those in the screen space for the pixel which is referred to by the area-contribution referring section 12 is the same as that described in the first processing method.

First, the rendering section 16 reads out the sum of area contributions $\alpha_{sum}$ and the sum of pixel contributions $\gamma_{sum}$ of a pixel to be processed from the memory. Only when the sums $\alpha_{sum}$ and $\gamma_{sum}$ are both smaller than 1, a first temporary value (Temp1) for the sum of area contributions is calculated by adding $\alpha_{sum}$ to the area contribution $\alpha$ which is calculated by the area-contribution referring section 12, and a second temporary value (Temp2) for the sum of pixel contributions is calculated by adding $\gamma_{sum}$ to a product of the area contribution $\alpha$ and the opacity $\beta$ which is referred to by the texture-data referring section 14. That is, Temp1=$\alpha_{sum}$+$\alpha$, and Temp2=$\gamma_{sum}$+$\alpha\beta$.

(1) If Temp1 and Temp2 are both equal to or smaller than 1 (Temp1≦1 and Temp2≦1):

The sum of the area contributions $\alpha_{sum}$ is updated to be Temp1, and the sum of the pixel contributions $\gamma_{sum}$ is updated to be Temp2. The intensity value is updated to be a value which is obtained in the following manner: a product of $\alpha$ and $\beta$ is multiplied by the intensity value ($I_R$, $I_G$, $I_B$) which is referred to by the texture-data referring section 14; and the multiplied result is added to the intensity value ($Id_R$, $Id_G$, $Id_B$) which is read out from the memory:

(Intensity value)=αβ($I_R$, $I_G$, $I_B$)+($Id_R$, $Id_G$, $Id_B$) (105)

(2) If Temp1 is larger than 1, and Temp2 is equal to or smaller than 1 (Temp1>1 and Temp2≦1):

The intensity value is updated to be the following value, and the sum of area contributions is updated to be 1:

(Intensity value)=(1−$α_{sum}$)β($I_R$, $I_G$, $I_B$)+($Id_R$, $Id_G$, $Id_B$) (106)

The sum of pixel contributions is updated to be the following value:

(Sum of pixel contributions)=$γ_{sum}$+(1−$α_{sum}$)β (107)

(3) If Temp2 is larger than 1 (Temp2>1):

The intensity value is updated to be the following value and the sum of area contributions and the sum of pixel contributions are updated to be 1:

(Intensity value)=(1−$γ_{sum}$)($I_R$, $I_G$, $I_B$)+($Id_R$, $Id_G$, $Id_B$) (108)

The one-screen processing completion determining section 17 determines whether the processing to all of the micro-polygons generated for one polygon or curved surface is completed or not. If the processing is not completed, the foregoing processes are repeatedly performed until all of the micro-polygons generated for on a polygon or curved surface are processed. If it is determined that the processing is completed, the sum of area contributions is initialized to be 0. The aforementioned processing is repeatedly performed until the one-scene processing completion determining section 18 determines that the processing to all data for one scene is completed.

If the one-scene processing completion determining section 18 determines that the processing is completed, the intensity-value correcting section 19 updates, for a pixel having a sum of pixel contributions smaller than 1, the intensity value to be a value obtained as follows: the sum of pixel contributions is subtracted from 1; the subtracted result is multiplied by the intensity value ($Ib_R$, $Ib_G$, $Ib_B$) which is applied as a background; and the multiplied result is added to the stored intensity value ($Id_R$, $Id_G$, $Id_B$):

(Intensity value)=($Id_R$, $Id_G$, $Id_B$)+(1−$γ_{sum}$)($Ib_R$, $Ib_G$, $Ib_B$) (109)

Hereinafter, a second example of the invention will be described with reference to the relevant figures.

In the first example, the area contribution is calculated by referring to the area-contribution table. In the second example, a method for calculating an area contribution by arithmetic operations will be described.

Figure 2:
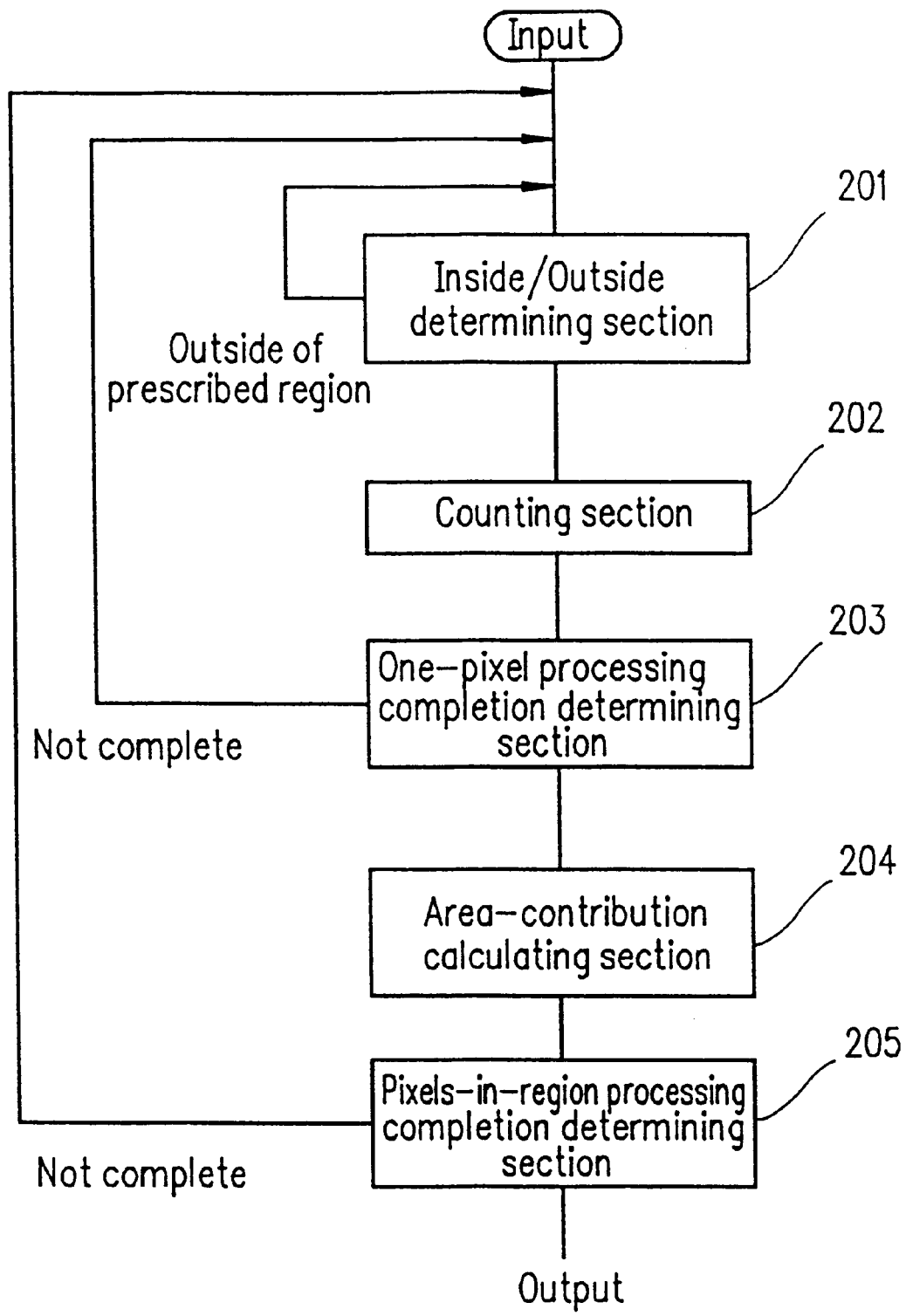
FIG. 2 is a diagram showing the construction of an image generator in a second example of the invention.

FIG. 2 shows the image generator in the second example of the invention. In FIG. 2, the image generator includes an inside/outside determining section 201, a counting section 202, a one-pixel processing completion determining section 203, an area-contribution calculating section 204, and a pixels-in-region processing completion determining section 205. The inside/outside determining section 201 determines whether an interior point of a sub-micropolygon exists within a region defined by a micro-polygon or not. The counting section 202 counts the number of sub-micropolygons inside of the region defined by the micro-polygon. The one-pixel processing completion determining section 203 determines whether the processing for one pixel is completed or not. The pixels-in-region processing completion determining section 205 determines whether the processing for all pixels within a prescribed region is completed or not.

As for the image generator in the second example, the logical background will be described below, and the operation thereof will be described. As described in the first example, if the prescribed size of a micro-polygon is 1 or less, the micro-polygon stays within the region of 5×5 pixels (it is noted that the base point is positioned within the center one of the 5×5 pixels). When the 5×5-pixel region is indicated by Ω, a region defined by the micro-polygon is indicated by D, and a pixel region at the position (i, j) is indicated by $P_{ij}$, the following equation is established in accordance with the definition of an area contribution:

(Contribution of $P_{ij}$)=$\iint_{(x,y)\in P_{ij}\cap D} dxdy$ (110)

In general, when an integral is defined by a set S, the following relationship is established for an integrable function f on the set S, where A is a subset of S:

$\int_A f(s)ds = \int_S Ind_A(s)f(s)ds$ (111)

$Ind_A(s) = \begin{cases} 1 & \text{if } s \in A \\ 0 & \text{if } s \notin A \end{cases}$ (112)

Accordingly, from Equations (110), (111), and (112), the following relationship is established:

(Contribution of $P_{ij}$)=$\iint_\Omega Ind_{P_{ij}\cap D}((x,y))dxdy$ (113)

Figure 17:
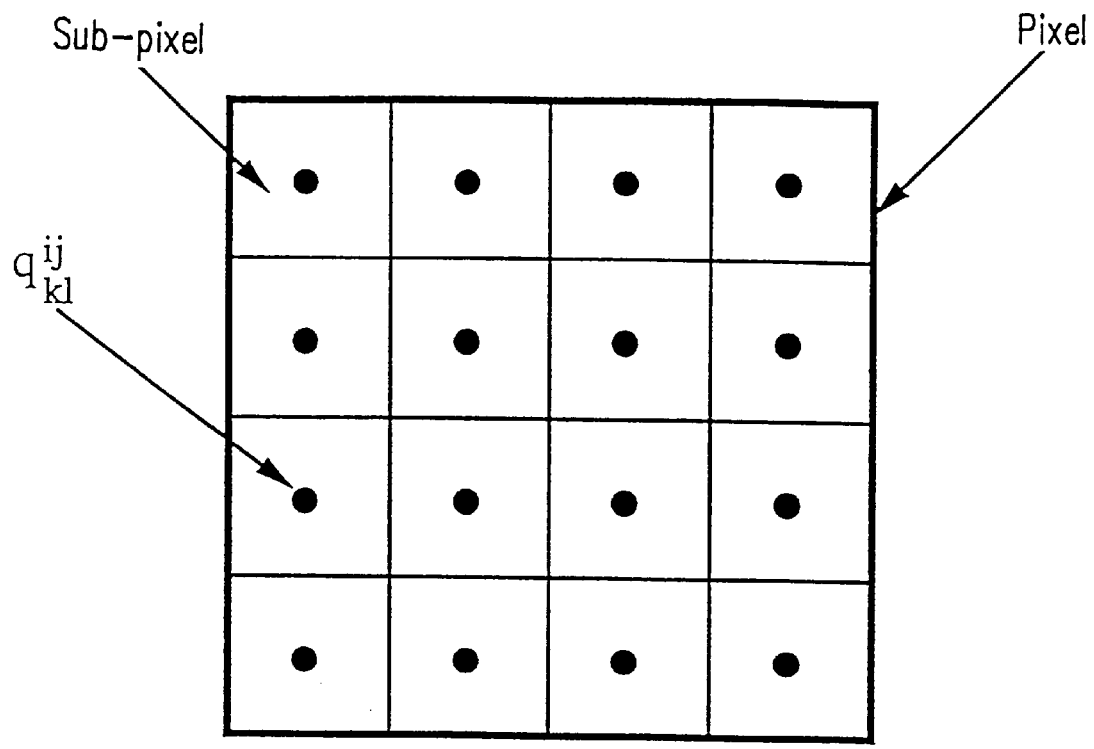
FIG. 17 is a diagram for illustrating a subpixel and its center.

Now, a process for making Equation (113) discrete is considered. FIG. 17 is a diagram when each side of $P_{ij}$ is divided into $2^n$ equal parts, and $2^{2n}$ sub-pixels are generated. When an interior point of one of the sub-pixels is assumed to be a center of gravity, the center of gravity can be represented as follows while introducing a kl-coordinate system:

$$q_{kl}^{ij} = \left(i - \frac{1}{2} + \frac{1}{2^{n+1}} + \frac{k}{2^n}, j - \frac{1}{2} + \frac{1}{2^{n+1}} + \frac{l}{2^n}\right)$$ (114)

where $q_{kl}^{ij}, 0 \leq k, l \leq 2^n - 1$ (115)

By using this, Equation (113) can be expressed as a limit of the following discrete equation:

(Contribution of $P_{ij}$) = $\lim_{n\to\infty} \sum_{k=0}^{2^n-1} \sum_{l=0}^{2^n-1} \frac{1}{2^{2n}} Ind_{P_{ij}\cap D}(q_{kl}^{ij})$ (116)

Figure 18:
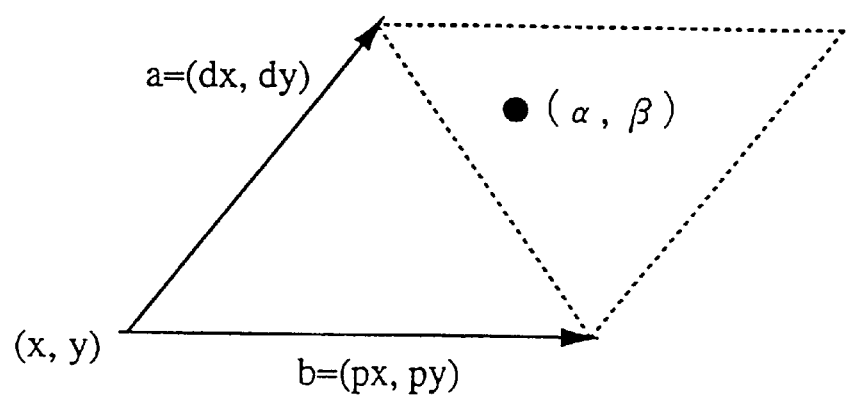
FIG. 18 is a diagram for illustrating a lemma for determining whether a base point is positioned inside or outside of a micro-polygon.

The right side of Equation (116) can be interpreted that the number of centers of gravity exist within a shared area of $P_{ij}$ and D is obtained, and the number is multiplied by an area of the sub-pixels. Accordingly, it is necessary to determine whether each center of gravity is positioned within the shared area of $P_{ij}$ and D or not. This determination can be performed on the basis of the following four lemmas (see FIG. 18).

Lemma 1: It is assumed that a base point (x, y) and two vectors (dx, dy) and (px, py) originating from the base point are given, and that a certain point (α, β) which satisfies the following relationship is given:

(α−x, β−y)=s(dx, dy)+t(px, py).

If 0≦s≦1 and 0≦t≦1, then the point (α, β) is positioned in a parallelogram (including the boundary thereof) defined by the base point (x, y) and the two vectors (dx, dy) and (px, py) originating from the base point.

Lemma 2: It is assumed that a base point (x, y) and two vectors (dx, dy) and (px, py) originating from the base point are given, and that a certain point (α, β) which satisfies the following relationship is given:

(α−x, β−y)=s(dx, dy)+t(px, py).

If 0<s<1 and 0<t<1, then the point (α, β) is positioned in a parallelogram (excluding the boundary thereof) defined by the base point (x, y) and the two vectors (dx, dy) and (px, py) originating from the base point.

Lemma 3: It is assumed that a base point (x, y) and two vectors (dx, dy) and (px, py) originating from the base point are given, and that a certain point (α, β) which satisfies the following relationship is given:

(α−x, β−y)=s(dx, dy)+t(px, py).

If $0 \leq s \leq 1$, and $0 \leq t \leq 1$, and $0 \leq s+t \leq 1$, then the point (α, β) is positioned in a triangle (including the boundary thereof) defined by the base point (x, y) and the two vectors (dx, dy) and (px, py) originating from the base point.

Lemma 4: It is assumed that a base point (x, y) and two vectors (dx, dy) and (px, py) originating from the base point are given, and that a certain point (α, β) which satisfies the following relationship is given:

(α−x, β−y)=s(dx, dy)+t(px, py).

If 0<s<1, and 0<t<1, and 0<s+t<1, then the point (α, β) is positioned in a triangle (excluding the boundary thereof) defined by the base point (x, y) and the two vectors (dx, dy) and (px, py) originating from the base point.

For all of the above-described lemmas 1, 2, 3, and 4, s and t can be obtained as follows, if (dxpy−pxdy) is not equal to 0:

$$\begin{pmatrix} s \\ t \end{pmatrix} \simeq \frac{1}{dxpy - dypx} \begin{pmatrix} py & -px \\ -dy & dx \end{pmatrix} \begin{pmatrix} \alpha - x \\ \beta - y \end{pmatrix} \quad (117)$$

However, if (dxpy−pxdy) is equal to 0, there is no solution (this indicates that the parallelogram or the triangle is collapsed).

In view of the above description, the operation will be described below. Data including a base point and vectors for defining a micro-polygon and data of 5×5-pixel region having the base point as its center are input into the inside/outside determining section 201. In the case of the quadrangle micro-polygon, the micro-polygon is divided into two triangles. The inside/outside determining section 201 determines whether the condition of (dxpy−pxdy)=0 is satisfied or not. If it is determined to be 0, the area contributions to all of the pixels in the 5×5-pixel region are 0, so that the whole process is terminated. If (dxpy−pxdy) is not equal to 0, the following processing is performed pixel by pixel in the 5×5-pixel region.

First, s and t are obtained for the center of gravity of the sub-pixel on the basis of Equation (117). In the case of the parallelogram micro-polygon, whether Lemma 1 or Lemma 2 is satisfied or not is determined. In the case of the quadrangle or triangle micro-polygon, whether Lemma 3 or Lemma 4 is satisfied or not is determined. If any one of the lemmas is satisfied, the counting section 202 increments the contents of a corresponding counter by one (counters for Lemmas 1, 2, 3, and 4 are denoted by count1, count2, count3, and count4, respectively).

This processing is repeated until the one-pixel processing completion determining section 203 determines that the processing for all of the sub-pixels in one pixel is completed. If the one-pixel processing completion determining section 203 determines that the processing for all of the sub-pixels in one pixel is completed, the area-contribution calculating section 204 calculates:

for the parallelogram micro-polygon,
    count=count2+(count1−count2)/2; and
for the quadrangle or triangle micro-polygon,
    count=count4+(count3−count4)/2.

Then, the obtained count is multiplied by the area of the sub-pixel, so as to obtain the area contribution of the pixel. The resultant area contribution is rounded off in accordance with the required precision in a plus direction. The processing is repeatedly performed until the pixels-in-region processing completion determining section 205 determines that the processing of all of the pixels in the 5×5-pixel region is completed. If the processing is determined to be completed, the whole process is terminated.

Figure 19:
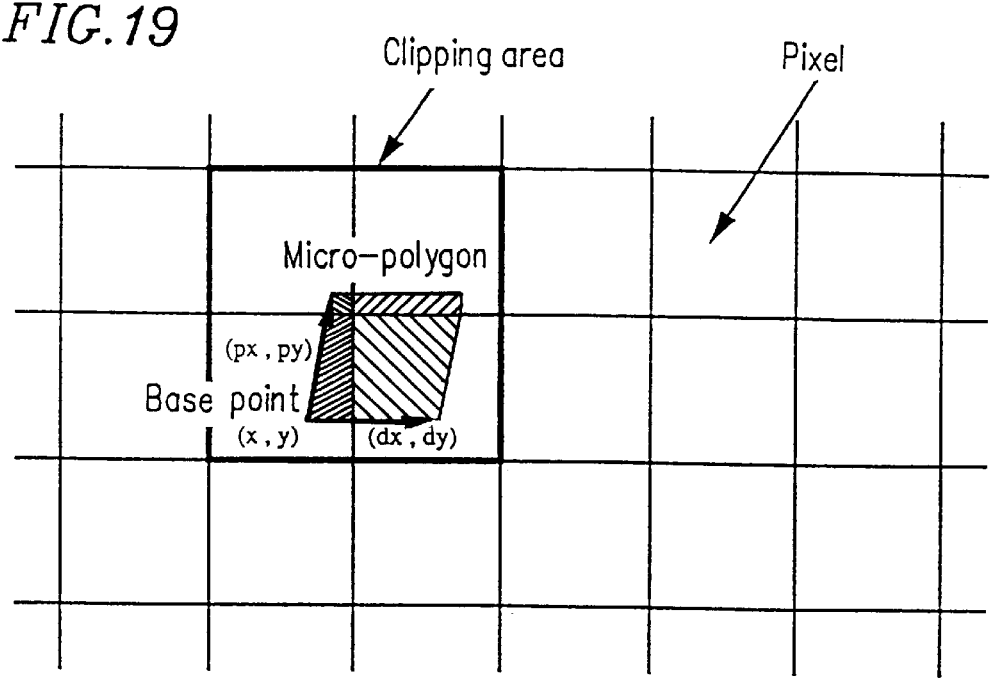
FIG. 19 is a diagram showing a minimum rectangle region including a micro-polygon.

In this example, the processing is performed to the 5×5-pixel region. However, as described in the first example, if the prescribed size is 1 or less, a micro-polygon having the maximum size exists within the 3×3-pixel region. Accordingly, if any pre-processing section for obtaining a minimum rectangular region included within the micro-polygon is provided, the number of pixels to be processed can be further decreased. For example, it is seen in the case of FIG. 19 that a 2×2-pixel region is sufficient for the processing. The method described in the second example can be employed for producing an area-contribution table in the first example.

As described above, according to the invention, a curved surface and a polygon defined in the 3-dimensional space is geometrically transformed into the 2-dimensional screen space, and then the generation of micro-polygons is performed. Therefore, the calculation amount for the geometrical transformations is drastically reduced as compared with the prior art, so that fast processing can be realized.

Specifically, in fact, in the geometrical transformations of the curved surface and the polygon into the 2-dimensional screen space, the vertices, control points, interior dividing points which define the curved surface and the polygon are geometrically transformed. The number of such vertices and points is smaller than the number of micro-polygons by one to three orders. Accordingly, the calculation amount required for the geometrical transformations is reduced at least by one to two orders, which greatly affect the increase of the processing rate.

In addition, in the generation process of micro-polygons, when a micro-polygon is generated in the 3-dimensional space as in the prior art, three coordinate values or components are required to be calculated for defining the position and the size thereof. While a micro-polygon is generated in the 2-dimensional space, two coordinate values or components are enough for defining the position and the size thereof. In view of this, the calculation amount is reduced to be ⅔ as compared with the prior art.

In the conventional method, the rendering is performed by jittering, so that the generation of random numbers is required. On the other hand, in this invention, the area contribution is determined by using a table, so that the generation of random numbers is not required and hence fast processing can be realized. The method of this invention including the area contributions in a table format has the additional feature that the method can be easily implemented by hardware. Moreover, the number of entries into the table can be decreased if the shapes of micro-polygons are limited to a parallelogram and a triangle. In such a case, a divided surface or a sub-polygon which is obtained by dividing the curved surface or the polygon is approximated by a parallelogram or triangle micro-polygon.

The area contribution can be obtained by calculation instead of the use of the table. In this invention, the calculation for the area contribution is performed by a method which applies an area integration. This method can be used for producing the area-contribution table.

The parallelogram or triangle micro-polygon can be defined by the positional coordinates of a base point and two vectors originating from the base point, and an address used when the table is referred to is generated from the base point and the two vectors in this invention. If the maximum size of a micro-polygon is determined, and the sizes of micro-polygons are discretely set up to the maximum size, the size of the table can be finite. At this time, a rectangular region of pixels is determined so that the micro-polygon having the maximum size never goes outside of the rectangular region while the base point of the micro-polygon having the maximum size is fixed within one pixel, and the micro-polygon having the maximum size is moved to any desired position. One entry of the area-contribution table is sufficient, if it can store area contributions to pixels included in the rectangular region. However, in such a case, the size of one entry is large. Accordingly, in this invention, the size of the area-contribution table is reduced so that one entry thereof includes area contributions to pixels included in a partial region in which the maximum size micro-polygon can be included and an identifier indicative of the position where the partial region is positioned in the rectangular region.

The fact that the maximum size of the micro-polygon is determined means that there may be a case where a sub-polygon or a divided surface which is obtained by dividing a polygon or a curved surface in accordance with a predetermined procedure has a size larger than the maximum size. In such a case, a re-division process is required. In this invention, the re-division is performed in accordance with a recurrent algorithm for re-division.

Some micro-polygons such as micro-polygons facing backwards are not reflected in the resultant generated image. This invention utilizes a method for culling the back-facing micro-polygons. Whether a micro-polygon faces backwards or not is generally determined by the direction of a surface of the original curved surface and the direction of the normal of the micro-polygon. This determination method is utilized in this invention. In a unit of curved surface or a polygon, a sorting is performed with respect to the depth. In the case where the hidden face processing is performed by the sorting, if the generation sequence of micro-polygons of the curved surface is not considered, there may occur a case where a hidden micro-polygon which is positioned at the deep position is rendered. As for the curved surface, the generation sequence of micro-polygons can be controlled by the index sequence of control points. Unless the access sequence to the intensity value data such as texture is also considered at this time, the direction in which the texture is mapped may be mistaken. In this invention, in view of this, the access sequence to the intensity value data as well as the generation sequence of micro-polygons are changed.

In order to actually generate an image, it is necessary to store data into a frame memory and the like. In this invention, the storing into the memory is performed in view of the area contributions for removing aliasing noise. If there is no error, the area contribution to each pixel is equal to or smaller than 1. However, any error may inevitably be included, and there may be a case where a value obtained by adding area contributions to micro-polygons for one pixel to each other exceeds 1. In order to handle such a case, in this invention, the sum of area contributions is made to be equal to or smaller than 1, so that the transparency of an object can be represented. In addition, the storing order into the memory is different between the case where the data is stored from the deepest one and the case where the data is stored from the closest one. This invention can accommodate both cases.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for generating an image by mapping texture data onto a surface of an object, and the apparatus comprising:

geometrical transformation means for calculating sample points on a curved surface defined in a 3-dimensional space and for geometrically transforming only said sample points to points in a 2-dimensional screen space;

micro-polygon generating means for calculating control parameters from said points in said 2-dimensional screen space and for generating micro-polygons by the calculation and using said control parameters and the size of texture data for mapping;

area contribution determining means for calculating an area contribution of said micro-polygon for each pixel defined on said 2-dimensional screen space;

texture data acquiring means for acquiring said texture data corresponding to said each micro-polygon;

intensity-value determining means for calculating an intensity value at said each pixel from said area contribution and said texture data; and back-face culling means for determining whether said micro-polygon is rendered or not by the direction of the normal vector of said micro-polygon and the information for the direction of the front face of the original curved surface generating said micro-polygon.

2. An apparatus for generating an image by mapping texture data onto a surface of an object, and the apparatus comprising:

geometrical transformation means for calculating sample points on a curved surface defined in a 3-dimensional space and for geometrically transforming only said sample points to points in a 2-dimensional screen space;

micro-polygon generating means for calculating control parameters from said points in said 2-dimensional screen space and for generating micro-polygons by the calculation and using said control parameters and the size of texture data for mapping;

area contribution determining means for calculating an area contribution of said micro-polygon for each pixel defined on said 2-dimensional screen space;

texture data acquiring means for acquiring said texture data corresponding to said each micro-polygon;

intensity-value determining means for calculating an intensity value at said each pixel from said area contribution and said texture data;

means for changing the order of generating micro-polygons from a curved surface in accordance with each depth position of said micro-polygons; and means for changing the order of access to texture data to correspond to the changed order of generating said micro-polygons.

3. An apparatus for generating an image by mapping texture data onto a surface of an object, and the apparatus comprising:

geometrical transformation means for calculating sample points on a curved surface defined in a 3-dimensional space and for geometrically transforming only said sample points to points in a 2-dimensional screen space;

micro-polygon generating means for calculating control parameters from said points in said 2-dimensional screen space and for generating micro-polygons by the calculation and using said control parameters and the size of texture data for mapping;

area contribution determining means for calculating an area contribution of said micro-polygon for each pixel defined on said 2-dimensional screen space;

texture data acquiring means for acquiring said texture data corresponding to said each micro-polygon; and intensity-value determining means for calculating an intensity value at said each pixel from said area contribution and said texture data;

wherein said area contribution determining means includes;

inside/outside determining means for determining whether the representative point of a sub-pixel generated by dividing a pixel in accordance with the accuracy of the calculation is positioned within a region defined by the micro-polygon or not;

counting means for counting the number of sub-pixels whose representative points are included within said region of the micro-polygon from the consequence of said inside/outside determining means; and area contribution calculating means for calculating the area contribution of said micro-polygon for each pixel by multiplying the number counted by said counting means into the area of said sub-pixel.

4. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon;

(e) determining an intensity value at said each pixel from said area contribution determined in said step (c) and said texture data acquired in said step (d); and further comprising the step of determining whether said micro-polygon is rendered or not by the direction of the normal vector of said micro-polygon and the information for the direction of the front face of the original curved surface generating said micro-polygon.

5. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon;

(e) determining an intensity value at said each pixel from said area contribution determined in said step (c) and said texture data acquired in said step (d); and further comprising the steps of:

changing the order of generating micro-polygons from a curved surface in accordance with each depth position of said micro-polygons; and changing the order of access to texture data to correspond to said changed order of generating said micro-polygons.

6. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon; and (e) determining an intensity value at said each pixel from said area contribution determined in said step (c) and said texture data acquired in said step (d);

wherein said step (c) includes the steps of;

(f) determining whether the representative point of a sub-pixel generated by dividing a pixel in accordance with the accuracy of the calculation is positioned within a region defined by the micro-polygon or not; and (g) counting the number of sub-pixels whose representative points are included within said region of the micro-polygon from the consequence of said step (f).

7. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon; and (e) determining an intensity value at said each pixel from said area contribution determined in said step (c) and said texture data acquired in said step (d);

wherein said step (e) includes the step of;

calculating an intensity value at each pixel by multiplying the intensity value of texture data by the area contribution, only when a sum of said area contribution is smaller than 1.

8. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon; and (e) determining an intensity value at said each pixel from said area contribution determined in said step (c) and said texture data acquired in said step (d);

wherein the texture data contains an intensity value and an opacity, and said step (e) includes the step of:

calculating an intensity value at each pixel with a product of the intensity value of texture data, the opacity, and the area contribution, only when a sum of said area contribution is smaller than 1.

9. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon; and (e) determining an intensity value at said each pixel from said area contribution determined in said step (c) and said texture data acquired in said step (d);

wherein the texture data contains an intensity value and an opacity, and a pixel contribution is defined as a product of the area contribution and said opacity of said texture data, said step (e) including the step of:

calculating an intensity value at each pixel, with a product of the intensity value of texture data, the opacity, and the area contribution, only when a sum of said pixel contribution is smaller than 1.

10. A method for generating an image by mapping texture data onto a surface of an object, the method comprising the steps of:

(a) geometrically transforming sample points calculated on a curved surface defined in a 3-dimensional space to points in a 2-dimensional screen space;

(b) generating a micro-polygon by the calculation and using control parameters calculated from said points in said 2-dimensional screen space, and the size of texture data for mapping;

(c) determining an area contribution of said micro-polygon for each pixel defined on said 2-dimensional screen space;

(d) acquiring said texture data corresponding to said each micro-polygon; and (e) determining an intensity value at said each pixel from said area contribution determined in said step (c) and said texture data acquired in said step (d);

wherein the texture data contains an intensity value and an opacity, and a pixel contribution is defined as a product of the area contribution and said opacity of said texture data, said step (e) including the step of:

calculating an intensity value at each pixel with a product of the intensity value of texture data, the opacity, and the area contribution, only when a sum of said area contribution is smaller than 1 and a sum of said pixel contribution is smaller than 1.

* * * * *